US010454694B2

(12) United States Patent
Ahi

(10) Patent No.: US 10,454,694 B2
(45) Date of Patent: Oct. 22, 2019

(54) INFORMATION PROCESSING APPARATUSES, INFORMATION PROVIDING METHODS, AND COMPUTER READABLE MEDIUMS FOR DETERMINING RELATIONSHIP INFORMATION ON A SOCIAL NETWORK SERVICE

(71) Applicant: LINE Corporation, Tokyo (JP)

(72) Inventor: Sercan Taha Ahi, Tokyo (JP)

(73) Assignee: Line Corporation, Tokyo (JP)

( * ) Notice: Subject to any disclaimer, the term of this patent is extended or adjusted under 35 U.S.C. 154(b) by 235 days.

(21) Appl. No.: 14/830,393

(22) Filed: Aug. 19, 2015

(65) Prior Publication Data

US 2016/0294570 A1     Oct. 6, 2016

(30) Foreign Application Priority Data

Mar. 31, 2015  (JP) ................................. 2015-073372

(51) Int. Cl.
*G06F 15/16* (2006.01)
*H04L 12/18* (2006.01)
(Continued)

(52) U.S. Cl.
CPC ...... *H04L 12/1822* (2013.01); *G06F 16/9024* (2019.01); *G06F 16/9535* (2019.01);
(Continued)

(58) Field of Classification Search
CPC ............. H04L 12/1822; G06F 17/2235; G06F 17/30867
(Continued)

(56) References Cited

U.S. PATENT DOCUMENTS

2008/0244019 A1    10/2008  Mellor et al.
2009/0006550 A1*   1/2009  Singh .................... G06Q 30/02
                                                  709/204

(Continued)

FOREIGN PATENT DOCUMENTS

CN          101277274 A      10/2008
CN          102369545 A       3/2012
(Continued)

OTHER PUBLICATIONS

Yoshino, T. et al., "Effect of Topic Offer Support that uses Information Stored in an SNS", Multimedia, Distributed, Cooperative, and Mobile Symposium, IPSJ Symposium Series, Information Processing Society of Japan, 2008, vol. 2008, No. 1, pp. 1549-1557.
(Continued)

*Primary Examiner* — Atta Khan
(74) *Attorney, Agent, or Firm* — Harness, Dickey & Pierce, P.L.C.

(57) ABSTRACT

An information processing apparatus includes registration management unit managing a registration of an association between accounts related to a message transmission/receiving service; and an information providing unit, in a case where, after the association between a first account and a second account is registered, message transmission/reception is not performed therebetween for a desired time period, providing related information, which is related to the first account and the second account, to a chat room where the message transmission/reception is performed between the first account and the second account.

30 Claims, 18 Drawing Sheets

(51) Int. Cl.
*G06F 16/901* (2019.01)
*G06F 17/22* (2006.01)
*H04L 12/58* (2006.01)
*G06Q 50/00* (2012.01)
*G06F 16/9535* (2019.01)

(52) U.S. Cl.
CPC ......... *G06F 17/2235* (2013.01); *G06Q 50/01* (2013.01); *H04L 12/1813* (2013.01); *H04L 51/04* (2013.01); *H04L 51/32* (2013.01)

(58) Field of Classification Search
USPC ........................................................ 709/201
See application file for complete search history.

(56) References Cited

U.S. PATENT DOCUMENTS

| | | | | |
|---|---|---|---|---|
| 2009/0307082 A1* | 12/2009 | Raghunathan | ......... | G06Q 30/02 705/14.44 |
| 2012/0086579 A1* | 4/2012 | Ara | ........................ | G06Q 10/10 340/691.6 |
| 2012/0236103 A1* | 9/2012 | Cahill | ................. | G06Q 10/101 348/14.01 |
| 2013/0117265 A1* | 5/2013 | Mizuguchi | ............. | G06Q 30/02 707/736 |
| 2014/0236953 A1* | 8/2014 | Rapaport | ............... | G06Q 10/10 707/740 |

FOREIGN PATENT DOCUMENTS

| | | |
|---|---|---|
| JP | 2003-022244 A | 1/2003 |
| JP | 2010128665 A | 6/2010 |
| JP | 2014119773 A | 6/2014 |
| JP | 2014-160510 A | 9/2014 |
| WO | WO-2010113614 A1 | 10/2010 |
| WO | WO-2012017786 A1 | 2/2012 |

OTHER PUBLICATIONS

Korean Office Action dated Nov. 9, 2018 for corresponding Korean Application No. 10-2017-7025160.
Chinese Office Action dated Aug. 28, 2019 for corresponding Chinese Application No. 201680019393.8.

* cited by examiner

FIG.5

| SPECIFIC INFOR- MATION 501 | NAME INFOR- MATION 502 | IMAGE INFOR- MATION 503 | DESCRIPTION INFORMATION 504 | INTERESTED FIELD 505 | AREA 506 | AGE (AGE-GROUP) 507 | ACCOUNT TYPE 508 | ... |
|---|---|---|---|---|---|---|---|---|
| User_ID_01 | USER 1 | IMAGE 1 | I work as an instructor in ZZ tennis school near XX station of YY line. | TENNIS SPORT WALK AND EAT OUT | TOKYO | EARLY 20'S | INDIVIDUAL | ... |
| User_ID_02 | USER 2 | IMAGE 2 | I work in an restaurant near XX station. | OVERSEA TRAVEL LEARN LANGUAGE TENNIS ITALIAN FOOD | TOKYO | LATE TEENS | INDIVIDUAL | ... |
| User_ID_03 | USER 3 | IMAGE 3 | | | KANAGAWA | EARLY 20'S | INDIVIDUAL | ... |
| ... | ... | ... | ... | ... | ... | ... | ... | ... |
| Official_ID_A | RES- TAURANT A | IMAGE A | An Italian restaurant near west exit of XX station. | | TOKYO | | OFFICIAL | ... |
| Official_ID_B | COMPANY B | IMAGE B | | | JAPAN | | OFFICIAL | ... |
| Official_ID_C | TALENT C | IMAGE C | | | JAPAN | | OFFICIAL | ... |
| ... | ... | ... | ... | ... | ... | ... | ... | ... |

| SPECIFIC INFORMATION 501 | REGISTRATION INFORMATION 601 | REGISTRATION DATE/TIME 602 | REGISTRATION LOCATION 603 | ... 409 |
|---|---|---|---|---|
| User_ID_01 | User_ID_02 | 20xx/11/06 20:05 | xxxx | ... |
|  | User_ID_03 | 20xx/03/15 10:11 | yyyy | ... |
|  | Official_ID_A | 20xx/08/30 19:43 | zzzz | ... |
|  | ... | ... | ... | ... |
| User_ID_02 | User_ID_01 | 20xx/11/06 20:05 | xxxx | ... |
|  | User_ID_03 | 20xx/01/15 13:12 | xxxx | ... |
|  | Official_ID_A | 20xx/04/08 12:05 | nnnn | ... |
|  | ... | ... | ... | ... |
| user_0003 | User_ID_01 | 20xx/03/15 10:10 | yyyy | ... |
|  | User_ID_02 | 20xx/01/15 13:11 | xxxx | ... |
|  | ... | ... | ... | ... |
| ... | ... | ... | ... | ... |

FIG.7

| User_ID_01 | | |
|---|---|---|
| LOG TYPE (701) | DATE/TIME (702) | ... (410) |
| ... | ... | ... |
| CHAT TRANSMISSION (to User_ID_03) | yy/mm/dd | ... |
| CHAT RECEPTION (from User_ID_03) | yy/mm/dd | ... |
| CHAT RECEPTION (from User_ID_03) | yy/mm/dd | ... |
| CHAT TRANSMISSION (to User_ID_03) | yy/mm/dd | ... |
| CHAT RECEPTION (from User_ID_03) | ... | ... |
| RELATIONSHIP REGISTRATION (with Official_ID_A) | yy/mm/dd | ... |
| ... | ... | ... |

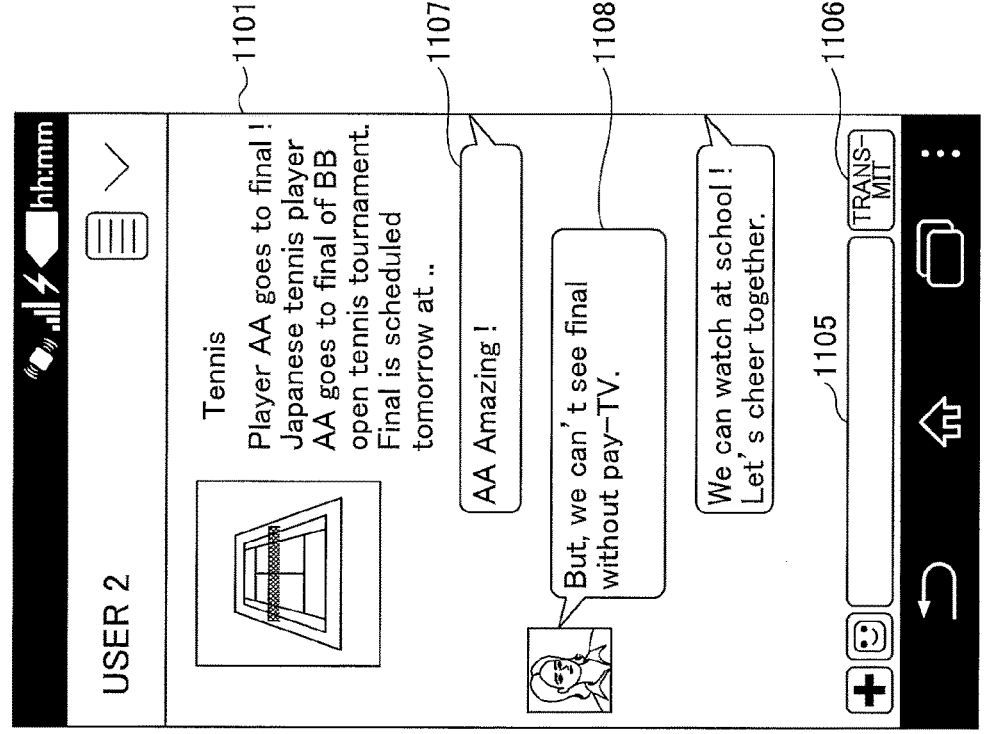
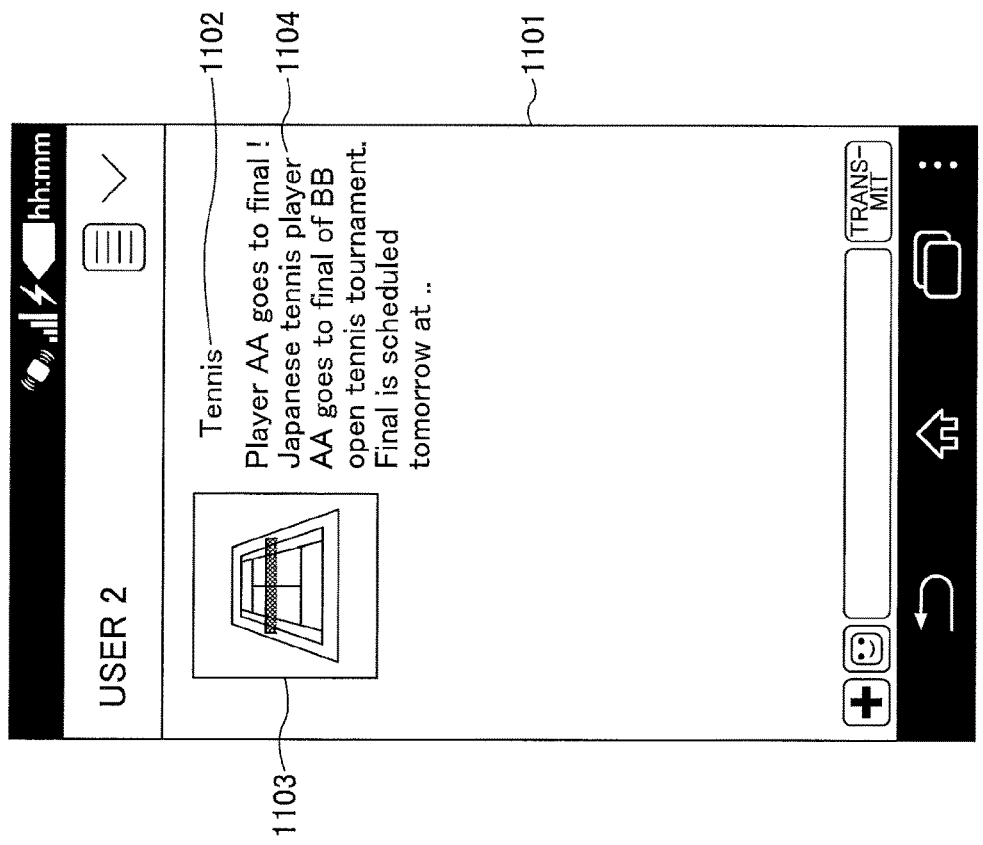

FIG.16A

NO. OF PATHS FROM USER 1 TO USERS

| NO. OF PATHS | |
|---|---|
| 1 | USER 11, USER 5, USER 7, USER 8 |
| 2 | USER 3, USER 9, USER 10, USER 13, USER 22 |
| 3 | USER 12, USER 14, USER 20, USER 25, USER 31 |

FIG.16B

NO. OF PATHS FROM USER 2 TO USERS

| NO. OF PATHS | |
|---|---|
| 1 | USER 34 |
| 2 | USER 3, USER 12 |
| 3 | USER 41, USER 50 |

INFORMATION PROCESSING APPARATUSES, INFORMATION PROVIDING METHODS, AND COMPUTER READABLE MEDIUMS FOR DETERMINING RELATIONSHIP INFORMATION ON A SOCIAL NETWORK SERVICE

CROSS-REFERENCE TO RELATED APPLICATIONS

This U.S. non-provisional application is based on and claims the benefit of priority under 35 U.S.C. § 119 to Japanese Patent Application No. 2015-073372 filed on Mar. 31, 2015, in the Japanese Patent Office (JPO), the entire contents of which are incorporated herein in its entirety by reference.

BACKGROUND

1. Field

Example embodiments generally relate to information processing apparatuses, information providing methods, and a non-transitory computer readable mediums for determining relationships on a social network service.

2. Description of the Related Art

Conventional social network service providing systems provide services that allow a relationship to be set between user accounts by performing certain operations, such as sending messages, posts, and/or chats, between a plurality of users using information processing apparatuses. Users are typically required to establish and/or set a relationship between the accounts before it is possible to transmit and receive messages to and from each other by.

Further, in order to support the conversations in a virtual space on a network, conventional conversation supporting methods use a new web page based on an access counting number of users is generated, so that a plurality of users having the access counting numbers within a predetermined range are guided into the generated web page.

SUMMARY

According to an aspect of at least one example embodiment, an information processing apparatus includes a registration management unit managing registration of an association between accounts related to a message transmission/receiving service; and an information providing unit, in a case where, after the association between a first account and a second account is registered, message transmission/reception is not performed therebetween for a desired time period, providing related information, which is related to the first account and the second account, to a chat room where the message transmission/reception is performed between the first account and the second account.

According to at least one example embodiment, an information processing apparatus is provided, where the apparatus may include a memory having computer readable instructions stored thereon, and at least one processor configured to execute the computer readable instructions to, manage registration of an association between accounts related to a message transmission/receiving service, determine whether message transmission and/or reception has been performed between a first account and a second account within a desired time period, generate a chat room where the message transmission/reception is performed between the first account and the second account based on the determination results, and provide related information to the chat room, the related information including information related to the first account and the second account based on the determination results.

According to at least one example embodiment, the related information may include information of a third account whose associations with the first account and the second account are registered.

According to at least one example embodiment, the at least one processor may be further configured to execute the computer readable instructions to generate social graphs corresponding to the accounts related to the message transmission/receiving service, and the related information includes information related to a third account which is included in the social graph of the first account and in the social graph of the second account.

According to at least one example embodiment, the related information may include link information which creates an electronic invitation request to the third account to join the chat room.

According to at least one example embodiment, the third account may be an official account which officially distributes information by a desired account.

According to at least one example embodiment, the related information may include information which is related to a desired service.

According to at least one example embodiment, the related information may include link information which is related to a desired service.

According to at least one example embodiment, the at least one processor may be further configured to execute the computer readable instructions to manage log information which includes a history of the message transmission/reception, and provide the related information based on the history of the message transmission/reception.

According to at least one example embodiment, the at least one processor may be further configured to execute the computer readable instructions to manage information of a location or date/time when the registration of the association is performed, and provide the related information based on the location or date/time when the registration of the association between the first account and the second account is performed.

According to at least one example embodiment, the at least one processor may be further configured to execute the computer readable instructions to manage account information of the accounts related to the message transmission/receiving service, and the related information includes information common between or related to account information of the first account and account information of the second account.

According to at least one example embodiment, there is provided a non-transitory computer readable medium including computer readable instructions, which when executed by a processor, may configure the processor to manage a registration of an association between accounts related to a message transmission/receiving service, determine whether message transmission and/or reception has been performed between a first account and a second account within a desired time period, generate a chat room where the message transmission/reception is performed between the first account and the second account based on the determination results, and provide related information to the chat room, the related information including information related to the first account and the second account based on the determination results.

According to at least one example embodiment, the related information of the computer readable instructions may include information of a third account whose associations with the first account and the second account are registered.

According to at least one example embodiment, the non-transitory computer readable medium may include computer readable instructions to generate social graphs corresponding to the accounts related to the message transmission/receiving service, and wherein the related information includes information related to a third account which is included in the social graph of the first account and in the social graph of the second account.

According to at least one example embodiment, the non-transitory computer readable medium may include computer readable instructions wherein the related information includes link information which creates an electronic invitation request to the third account to join the chat room.

According to at least one example embodiment, the non-transitory computer readable medium may include computer readable instructions wherein the third account is an official account which officially distributes information by a desired account.

According to at least one example embodiment, the non-transitory computer readable medium may include computer readable instructions wherein the related information includes information which is related to a desired service.

According to at least one example embodiment, the non-transitory computer readable medium may include computer readable instructions wherein the related information includes link information which is related to a desired service.

According to at least one example embodiment, the non-transitory computer readable medium may include computer readable instructions to manage log information which includes a history of the message transmission/reception, and provide the related information based on the history of the message transmission/reception.

According to at least one example embodiment, the non-transitory computer readable medium may include computer readable instructions to manage information of a location or date/time when the registration of the association is performed, and provide the related information based on the location or date/time when the registration of the association between the first account and the second account is performed.

According to at least one example embodiment, the non-transitory computer readable medium may include computer readable instructions to manage account information of the accounts related to the message transmission/receiving service, and wherein the related information includes information common between or related to account information of the first account and account information of the second account.

According to at least one example embodiment, there is provided an information providing method used in an information processing apparatus which manages a message transmission/receiving service, the method may include registering an association between a first account and a second account, determining whether a message transmission and/or reception has been performed between the first account and the second account within a desired time period, extracting information related to the first account and the second account based on the results of the determining, and providing the extracted information to a chat room where the message transmission/reception is performed between the first account and the second account based on the results of the determining.

According to at least one example embodiment, the method may include wherein the related information includes information of a third account whose associations with the first account and the second account are registered.

According to at least one example embodiment, the method may include generating, using the at least one processor, social graphs corresponding to the accounts related to the message transmission/receiving service, and wherein the related information includes information related to a third account which is included in the social graph of the first account and in the social graph of the second account.

According to at least one example embodiment, the method may include wherein the related information includes link information which creates an electronic invitation request to the third account to join the chat room.

According to at least one example embodiment, the method may include wherein the third account is an official account which officially distributes information by a desired account.

According to at least one example embodiment, the method may include wherein the related information includes information which is related to a desired service.

According to at least one example embodiment, the method may include wherein the related information includes link information which is related to a desired service.

According to at least one example embodiment, the method may include managing, using the at least one processor, log information which includes a history of the message transmission/reception, and providing, using the at least one processor, the related information based on the history of the message transmission/reception.

According to at least one example embodiment, the method may include managing, using the at least one processor, information of a location or date/time when the registration of the association is performed, and providing, using the at least one processor, the related information based on the location or date/time when the registration of the association between the first account and the second account is performed.

According to at least one example embodiment, the method may include managing, using the at least one processor, account information of the accounts related to the message transmission/receiving service, and wherein the related information includes information common between or related to account information of the first account and account information of the second account.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 5 illustrates an example of account information according to at least one example embodiment;

FIG. 6 illustrates an example of relationship registration information according to at least one example embodiment;

FIG. 7 illustrates an example of log information according to at least one example embodiment;

FIGS. 11A and 11B illustrate example display screens (1) according to at least one example embodiment;

FIGS. 16A and 16B illustrate examples of distances between users according to at least one example embodiment;

DETAILED DESCRIPTION

Figure 1:
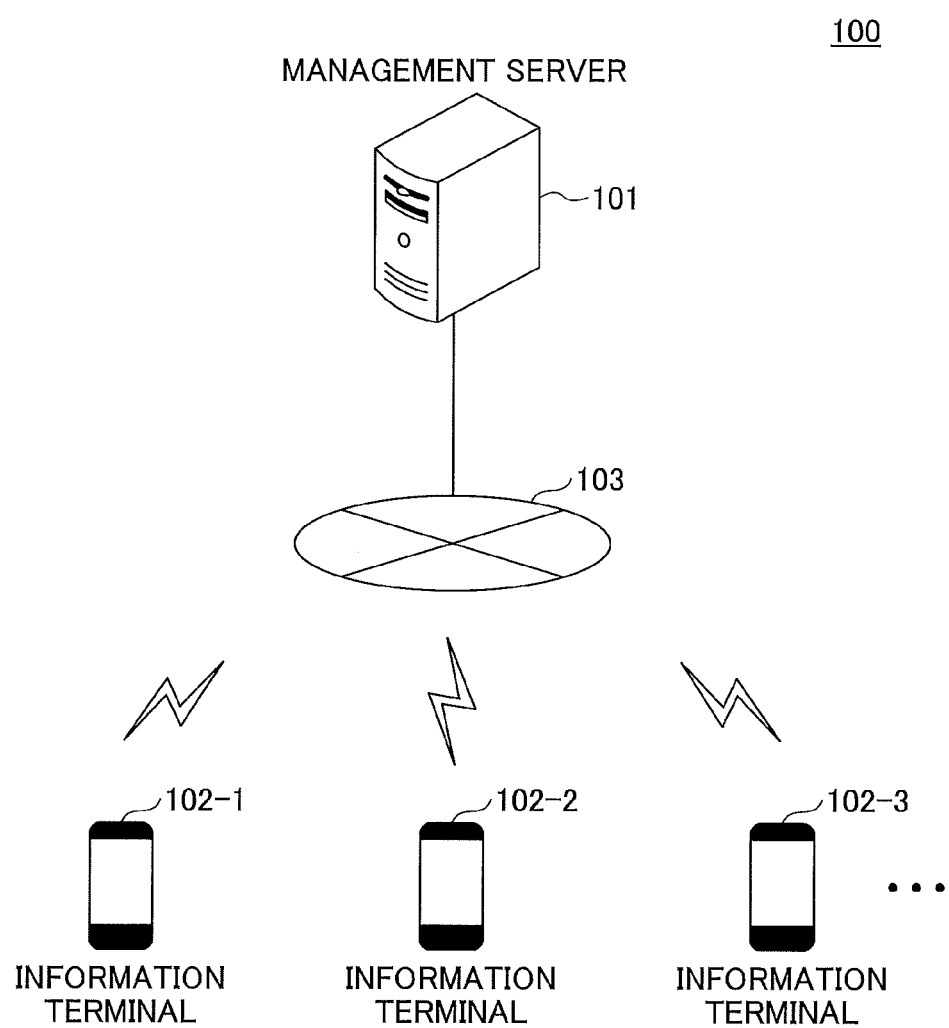
FIG. 1 illustrates an example configuration of an information processing system according to at least one example embodiment.

Various example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). As used herein the term "and/or" includes any and all combinations of one or more of the associated listed items.

It will be understood that, although the terms "first", "second", etc. may be used herein to describe various elements, components, regions, layers and/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

In related technologies of a message transmitting and receiving service in which messages are transmitted and received between (among) users who are registered with the service, there may be a situation where after an association is registered between accounts of users ("user accounts"), no communications starts between the users for some reason. In other words, there may be situations where two users (or more) who have established an association with each other's accounts have not communicated with each other. In such a case, it is thought to be difficult to promote communication between the users, who have not communicated with each other, even if, for example, those users are introduced on the same web page.

That is, in related technologies of the message transmitting and receiving service, after the association between the accounts of users is registered, it is difficult to promote communications between those users when the communications between the users has not started.

According to at least one example embodiment, improves and/or corrects the above problem, by promoting and/or encouraging communications between users who have not communicated with each other after the association between the accounts (e.g., establishment of a relationship between the accounts) thereof is registered in the message transmitting and receiving service, etc.

In the following, example embodiments are described in reference to the accompanying drawings.

System Configuration

FIG. 1 illustrates an example configuration of an information processing system 100 according to at least one example embodiment. For example, the information processing system 100 includes a management server 101 and a plurality of information terminals 102-1 through 102-3, which are connected to a communications and/or data network 103, such as the Internet, an intranet, a WAN, a LAN, a PAN, etc. In the following descriptions, in order to indicate any of the information terminals 102-1 through 102-3, the term "information terminal(s) 102" may be used. Further, note that the number of the information terminals 102 and management server 101 are examples only and are not limited thereto. The information processing system 100 may comprise two or more information terminals 102 and/or one or more management servers 101.

For example, the management server 101 is an information processing apparatus (e.g., a server, etc.) which provides a message transmitting and receiving service such as an instant messaging (IM) service, a text, video and/or audio chat service, an email service, an SMS/MMS texting service, etc. The management server 101 manages the registration of the relationship between accounts (e.g., friendship relationship, connection relationship, link relationship, etc.) in the message transmitting and receiving service, and provides the message transmitting and receiving service in which messages can be transmitted and received between the accounts whose relationship is registered.

The information terminal 102 is an information terminal which includes, for example, a smartphone, a cellular phone, a tablet terminal, a wearable terminal, a Personal Computer (PC), an Internet capable TV, a PDA, a video game machine, and/or any other computing/processing device capable of communication over a network, which is used by a user of the message transmitting and receiving service. The information terminal 102 connects to the network 103 by a Local Area Network (LAN), a public radio communication service, a cellular connection, a data packet network, etc., so as to communicate with the management server 101 and another information terminal 102. Further, the information terminal 102 stores an application program (e.g., a dedicated software program, a smart device app, a web browser or other software capable of accessing a website, an applet, a web browser plugin, etc.; hereinafter may be simplified as an "application") installed and/or operated therein which corresponds to the message transmitting and receiving service provided by the management server 101.

By having such a configuration described above, for example, by performing a desired (and/or alternatively, predetermined) operation with a user of the information terminal 102-2, it becomes possible for a user of the information terminal 102-1 to send a request to the management server 101 to register the relationship between the accounts. Upon receiving the request, the management server 101 associates the account of the user of the information terminal 102-1 with the account of the user of the information terminal 102-2, and stores and manages the association (relationship).

Further, the user of the information terminal 102-1 can use the message transmitting and receiving service provided by the management server 101, so as to transmit and receive messages to and from the user of the information terminal 102-2 whose account is in association with the account of the user of the information terminal 102-1.

For example, the management server 101 generates a virtual space (e.g., a chat room, a communication session, audio chat, video chat, audio and/or video conference call, etc.; hereinafter referred to as a "chat room") to transmit and receive messages (hereinafter referred to as "chat" or have chats") on the application on the information terminal 102-1 and/or the information terminal 102-2. Further, the management server 101 causes the information terminal 102-1 and the information terminal 102-2 to participate in the same communication session. For example, the management server 101 may serve as a relay and/or bridge, via a hosting process executing on the management server 101, for chats transmitted between the information terminal 102-1 and the information terminal 102-2. Additionally, the management server 101 may transmit communication information regarding each of the information terminal 102-1 and the information terminal 102-2 to the other and direct the applications to initiate communication protocols with the other. By doing this, it becomes possible for the user of the information terminal 102-1 to use the generated chat room and chat with the user of the information terminal 102-2 (or any other users/information terminals invited to the chat room).

Further, for example, in a case where, after the association between the two accounts is registered, chat does not start for a desired (or alternatively, predetermined) time period, the management server 101 according to at least one example embodiment provides information, which is related to one or more of those two accounts, to the chat room where chat is to be initiated (performed) between the two accounts.

According to at least one example embodiment, the information to be provided includes, for example, the information related to another account which is related to those two accounts, the information commonly included in the profile information of the two accounts, information indicating that the two accounts have a strong relationship, information indicating that the accounts share common interests, etc.

Between the users who have not started chat with each other for a desired (or alternatively, predetermined) time period, for example, even when a chat room is provided, it may be difficult to induce the participants to start chatting because there is no information about a common topic (of interest). According to at least one example embodiment, however, the information which is related to both users is provided to the chat room for (between) both users who have not started chat with each other for a desired (or alternatively, predetermined) time period. Therefore, it becomes easier for the users to start chatting (with each other).

As described, in the management server 101 according to at least one example embodiment, in the message transmitting and receiving service (chat service), it becomes easier to promote communications between users who have not started chat with each other after the association between the (user) accounts is registered.

Note that, the configuration of the information processing system 100 in FIG. 1 is an example embodiment only, and the inventive concepts presented herein are not limited thereto. For example, the information processing system 100 may include two or more information processing apparatuses and the management server 101 may include one or more server apparatuses. Further, the service which is used by the user with the information terminal 102 is not limited to the IM service. For example, the service may be a Social Networking Service (SNS), a telecommunications service, an email service, a blog service, etc. That is, some example embodiments may be applied to a service in which data such as a message are transmitted and received between the user accounts which are associated with each other due to a desired (or alternatively, predetermined) relationship therebetween.

Hardware Configuration

Next, various example embodiments of the hardware configurations of the management server 101 and the information terminal 102 are described.

Hardware Configuration of the Management Server 101

Figure 2:
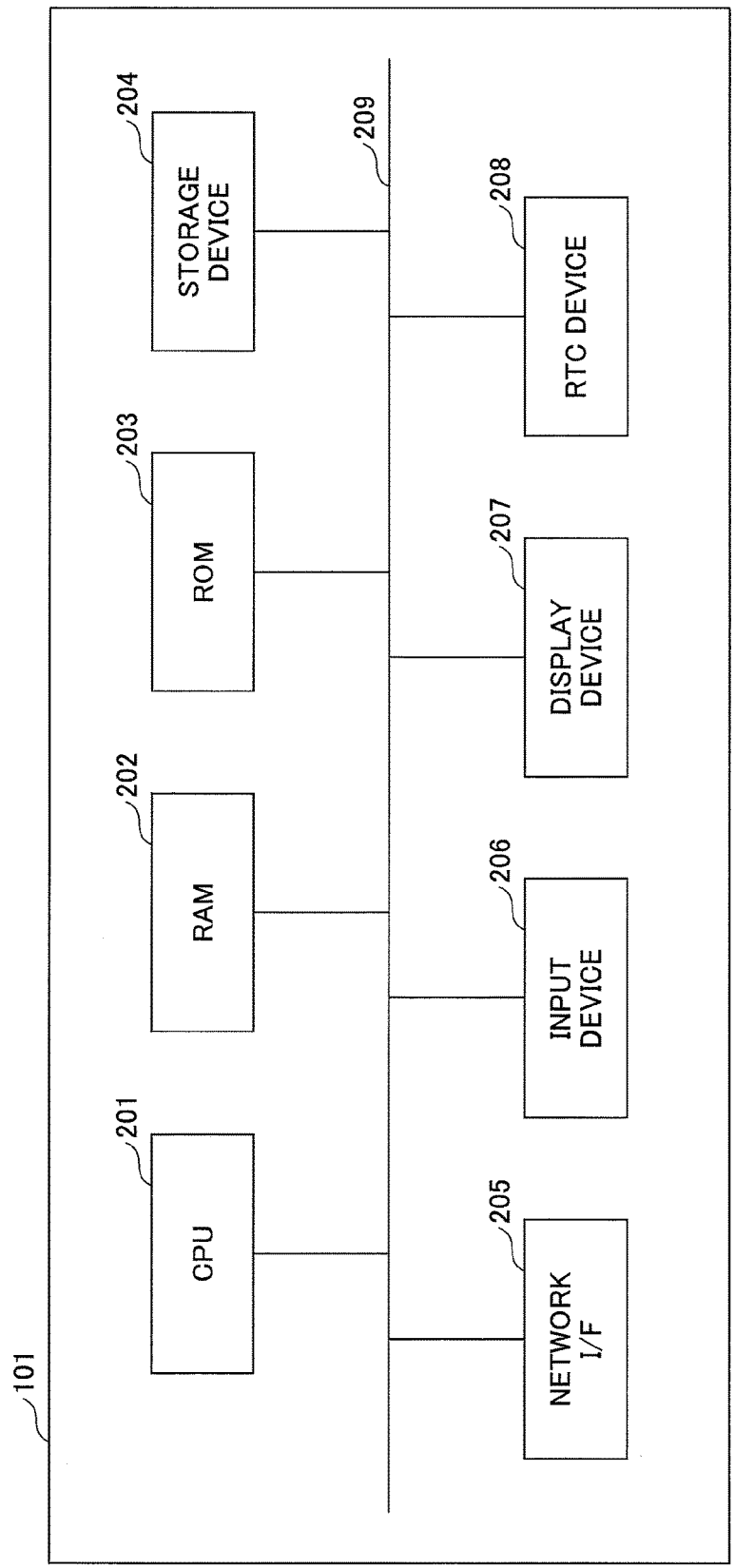
FIG. 2 illustrates an example hardware configuration of a management server according to at least one example embodiment.

FIG. 2 illustrates an example hardware configuration of the management server 101 according to at least one example embodiment. The management server 101 includes, for example, one or more Central Processing Units (CPU) 201, a Random Access Memory (RAM) 202, a Read-Only Memory (ROM) 203, a storage device 204, a network Interface (I/F) 205, an input device 206, a display device 207, a Real Time Clock (RTC) device 208, a bus 209, etc.

The CPU 201 is an arithmetic device, and/or processing device, which loads a program (e.g., computer readable instructions) and data stored in the ROM 203 or a storage section 204 to the RAM 202 and executes a process, so as to control and realize the functions of the entire management server 101. Once the program instructions are loaded into the CPU 201, the CPU 201 is programmed to perform the program instructions, thereby transforming the CPU 201 into a special purpose processor. The RAM 202 is a volatile memory and used as a work area, etc., of the CPU 201. The ROM 203 is a non-volatile memory storing, for example, the Basic Input/Output System (BIOS), which is executed when the management server 101 starts up, and various settings.

The storage device 204 is, for example, a Hard Disk Drive (HDD), a Solid State Drive (SDD), flash memory, etc., which stores an Operating System (OS), various application programs, etc.

The network I/F 205 is a communication interface which connects the management server 101 to the network 103 to communicate with the information terminal 102, etc.

The input device 206 is, for example, an input device such as a keyboard and a mouse, and is used when a user inputs various operation signals in the management server 101. For example, the display device 207 is a display device such as a display, and displays a result of processing performed by the management server 101. Note that, the input device 206, the display device 207, etc., may be connected to the management server 101 and used as on an as needed basis.

The RTC device 208 is backed up by a battery for back up, etc., and refers to a real-time clock, which keeps track of time and date even when power to the management server 101 is cut off.

The bus 209 is connected to each of the above elements to transmit an address signal, a data signal, various control signals, etc.

Additionally, while only a single CPU 201, RAM 202, ROM 203, storage device 204, network Interface (I/F) 205, input device 206, display device 207, RTC device 208, and bus 209 are depicted in FIG. 2, the example embodiments of the inventive concepts are not limited thereto. In other example embodiments, there may be more or less components installed in the management server 101, and each of the components of the management server 101 may number two or more.

Hardware Configuration of the Information Terminal 102

Figure 3:
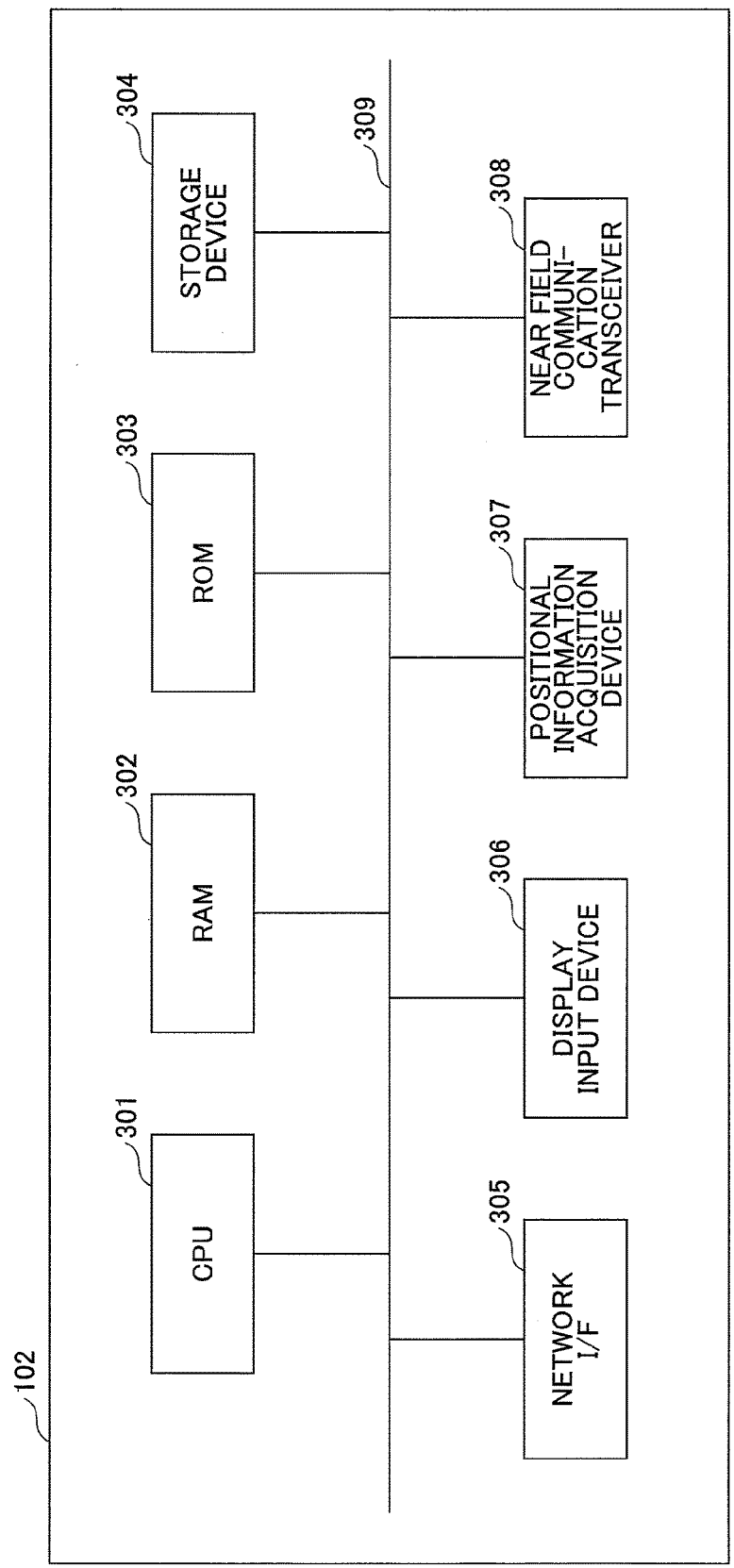
FIG. 3 illustrates an example hardware configuration of an information terminal according to at least one example embodiment.

FIG. 3 illustrates an example hardware configuration of the information terminal 102 according to at least one example embodiment. The information terminal 102 includes, for example, one or more CPUs 301, a RAM 302, a ROM 303, a storage device 304, a network I/F 305, a display input device 306, a positional information acquisition device 307, a Near Field Communication transceiver 308, a bus 309, etc.

The CPU 301 is an arithmetic device, and/or processing device, which loads a program (e.g., computer readable instructions) and data stored in the ROM 303 or a storage device 304 to the RAM 302 and executes a process, so as to control and realize the functions of the entire information terminal 102. Once the program instructions are loaded into the CPU 301, the CPU 301 is programmed to perform the program instructions, thereby transforming the CPU 301 into a special purpose processor. The RAM 302 is a volatile memory and used as a work area, etc., of the CPU 301. The ROM 303 is a non-volatile memory storing, for example, the Basic Input/Output System (BIOS), which is executed when the information terminal 102 starts up, and various settings.

The storage device 304 is, for example, a storage device such as the HDD, the SDD, or a flash ROM which stores an Operating System (OS), various application programs, etc.

The network I/F 305 is a communication interface which connects the information terminal 102 to the network 103 to communicate with the management server 101, another information terminal 102, etc.

The display input device 306 is, for example, a display input device such as a touch panel display, which receives an input operation by a user and displays a result of processing performed by the information terminal 102. The display input device 306 may be separated into an input device and a display device.

The positional information acquisition device 307 may be, for example, a Global Positioning System (GPS) receiving device that acquires positional information of the information terminal 102.

The Near Field Communication transceiver 308 is a communication device which performs desired (or alternatively, predetermined) near field communications with another portable terminal 10 using such as Bluetooth™, Bluetooth Low Energy (hereinafter "BLE"), etc.

The bus 309 is connected to each of the above elements to transmit an address signal, a data signal, various control signals, etc.

Additionally, while only a single CPU 301, RAM 302, ROM 303, storage device 304, network I/F 305, display input device 306, positional information acquisition device 307, Near Field Communication transceiver 308, bus 309 are depicted in FIG. 3, the example embodiments of the inventive concepts are not limited thereto. In other example embodiments, there may be more or less components installed in the information terminal 102, and each of the components of the information terminal 102 may number two or more.

Functional Configuration

Next, a functional configuration of the information processing system 100 according to at least one example embodiment is described.

Figure 4:
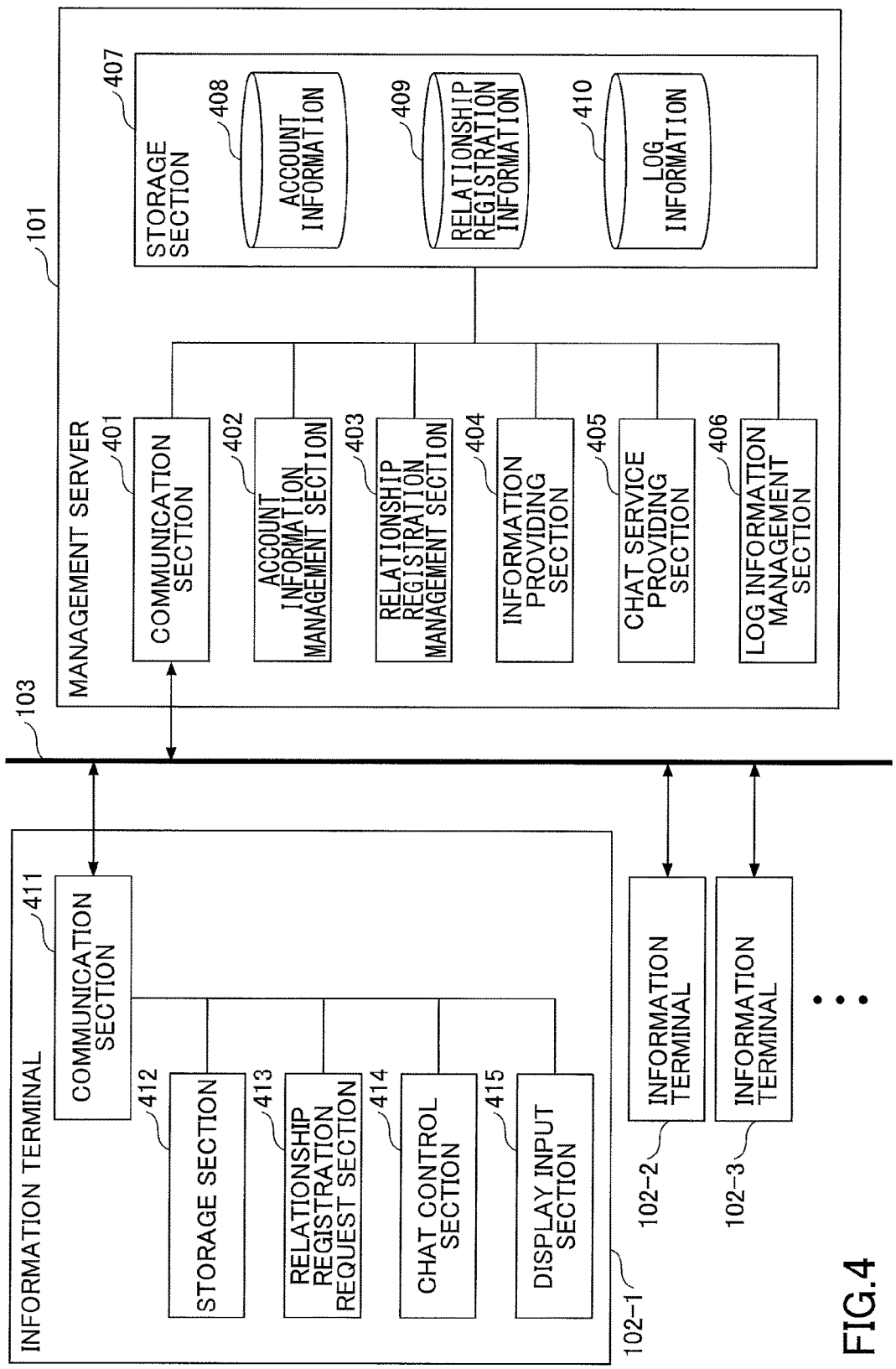
FIG. 4 illustrates an example functional configuration of the information processing system according to at least one example embodiment.

FIG. 4 illustrates an example functional configuration of the information processing system 100 according to at least one example embodiment.

Functional Configuration of the Management Server 101

For example, the management server 101 includes a communication section 401, an account information management section 402, a relationship registration management section 403, an information providing section 404, a chat service providing section 405, a log information management section 406, a storage section 407, etc.

The communication section 401 connects the management server 101 to the network 103, so as to transmit and receive data to and from the information terminal 102-1 through 102-3, etc. The communication section 401 is realized by, for example, the network I/F 205 and the program operated in CPU 201 of FIG. 2

The account information management section 402 stores the information of the accounts, which is related to the message transmitting and receiving service provided by the management server 101, in advance as account information 408 in the storage section 407, etc., and manages the account information 408. The account information management section 402 is realized by, for example, a program operated in the CPU 201 of FIG. 2.

Note that a user may have two or more accounts corresponding to specific information (e.g., unique identifier information (UID)) sets that differ from each other, each of the specific information sets including, for example, a user ID, a phone number, a mailing address, an email address, etc. Further, the account in at least one example embodiment includes not only an account of an individual user but also, for example, an official account, which refers to an account such as a business, a company, a group, a person, etc., determined in advance, and is provided to officially distribute the information thereof. Therefore, in the following description, it is assumed that the term "account" includes plural accounts of the same user having specific information sets different from each other, the official account, etc.

The relationship registration management section 403 associates the accounts with each other in accordance with a registration request which requests a registration of the association (e.g., a friendship relationship) between accounts from the information terminal 102, etc. Further, the relationship registration management section 403 stores the information of the accounts which are associated with each other in the storage section 407, etc., as relationship registration information 409. Further, the relationship registration management section 403 is realized by, for example, a program operated in the CPU 201 of FIG. 2.

In a case where, after an association between a first account and a second account is registered, no chat is started for a desired (or alternatively, predetermined) time period, the information providing section 404 provides the information, which is related to the first account and the second account, to the chat room between the first account and the second account.

Here, the information provided by the information providing section 404 includes, for example, the information of a third account whose associations with the first account and the second account are registered. Otherwise, the information provided by the information providing section 404 may include the information about a common field of interest, the common information on the profile information, the information having a strong relationship, etc., based on the account information of the first account and the account information of the second account. Further, the information providing section 404 is realized by, for example, a program operated in the CPU 201 of FIG. 2 and the RTC device 208, etc.

The chat service providing section 405 provides a chat service to plural accounts related to the message transmitting and receiving service, and is realized by, for example, a program operated in the CPU 201 of FIG. 2.

When chat is performed by using the information terminal 102-1 and the information terminal 102-2, for example, the chat service providing section 405 generates a chat room to perform chat on the applications of the information terminal 102-1 and the information terminal 102-2. Further, the chat service providing section 405 causes the information terminal 102-1 and the information terminal 102-2 to participate in the same communication session. Further, the chat service providing section 405 relays the messages transmitted and received between the information terminal 102-1 and the information terminal 102-2. In other words, chat data originating from information terminal 102-1 are transmitted to the management server 101, which then processes the chat data, determines the recipient of the chat data (e.g., information terminal 102-2), and then transmits the received chat data to the appropriate destination (e.g., information terminal 102-2). By doing this, it becomes possible to perform (have) a chat between the information terminal 102-1 and the information terminal 102-2.

Further, according to at least one example embodiment, it is assumed that a chat room is generated on the application of the information terminal 102. Note that, however, this configuration is an example only and the example embodiments are not limited thereto. For example, the chat service providing section 405 may generate a chat room on the management server 101.

The log information management section 406 stores, for example, the processing of the applications operated in the plural information terminals 102-1 through 102-3 and the histories of the operations in the storage section 407 as log information 410, and manages the log information 410. The log information management section 406 is realized by, for example, a program operated in the CPU 201 of FIG. 2. Further, the log information 410 includes, for example, the information indicating the time when the chat is transmitted and received and the time when the association between the accounts is registered.

The storage section 407 is configured to store, for example, the account information 408, the relationship registration information 409, the log information 410, etc., and is realized by the storage device 204 of FIG. 2, etc. Further, the storage section 407 may be realized by another server apparatus (e.g., a storage server, Cloud), etc.

The account information 408, the relationship registration information 409, and the log information 410 stored in the storage section 407 are described below.

Functional Configuration of the Information Terminal 102

For example, the information terminal 102 includes, for example, a communication section 411, a storage section 412, a relationship registration request section 413, a chat control section 414, and a display input section 415. Further, in FIG. 4, it is assumed that the information terminals 102-1 through 102-3 have the same configuration, but is not limited thereto.

The communication section 411 connects the information terminal 102 to the network 103, so as to transmit and received data to and from the management server 101, etc. The communication section 411 is realized by, for example, the network I/F 305 of FIG. 3 and the program operated in the CPU 301 of FIG. 3.

The storage section 412 is configured to store an application for the message transmitting and receiving service provided by the management server 101, and is realized by the storage device 304 of FIG. 3, etc.

The relationship registration request section 413 provides for a requesting of the registration of the association with another account in accordance with a desired (or alternatively, predetermined) operation performed on the application for the message transmitting and receiving service, and is realized by, for example, a program (application) operated in the CPU 301 of FIG. 3.

The chat control section 414 is a provides for controlling the transmission and receiving the messages (chat) in the message transmitting and receiving service provided by the management server 101, and is realized by the, for example, a program (application) operated in the CPU 301 of FIG. 3.

For example, the display input section 415 is configured to display on a display screen under the control of the chat control section 414 and receiving an operation by a user, and is realized by the display input device 306 of FIG. 3 and the program operated in the CPU 301 of FIG. 3.

Information Managed by the Management Server 101

Here, some examples of the information items managed by the management server 101 are described according to at least one example embodiment.

Account Information 408

FIG. 5 illustrates an example of the account information 408 according to at least one example embodiment. For example, the account information 408, which is managed by the account information management section 402, includes specific information 501, name information 502, image information 503, description information 504, etc.

The account information 408 further includes an interested field 505, an area 506, an age (age-group) 507, an account type 508, etc.

The specific information 501 refers to the information to uniquely identify the account (e.g., UIDs). To that end, for example, the phone number, the mailing address, the email address, and/or the user ID acquired from (or given by) the management server 101 is registered as the specific information 501. Note that any other information, which can uniquely identify the account, may also be used as the specific information 501.

As the name information 502, for example, a display name of the user or account, which is displayed in the chat room, etc., is displayed.

As the image information 503, for example, a profile image for each account is registered. For example, when an account is an individual's account or an official account of a famous person, etc., the image of the person is registered as the image information 503. Further, for example, when an account is an official account of a company, etc., a logo of the company, or an image of a product of the company is registered as the image information 503. Note that the above description illustrates examples only and any other image other than the above (e.g., an image of a person, a logo of a company, a product image of a company, etc.) may be registered as the image information 503.

As the description information 504, for example, a sentence(s) of a brief self-introduction, comment, or some words describing the account are registered.

As the interested field 505, for example, one or more fields of interest for each account is registered and described.

As the area 506, for example, a residence area of an individual user, or a service area of a company or shop is registered.

As the age 507, for example, the information related to the age of a user such as the age, year, etc., is registered.

As the account type 508, for example, the information of the account type such as an individual (personal) account, an official account, etc., is registered (stored).

Note that the items of the account information 408 in FIG. 5 are examples only. Further, in the account information 408, various information items, which are related to the account and in association with the specific information 501, are stored.

Relationship Registration Information 409

FIG. 6 illustrates an example of the relationship registration information 409 according to at least one example embodiment. The relationship registration information 409, which is managed by the relationship registration management section 403, stores registration information 601 which includes a plurality of account information sets whose associations with respective data of the specific information 501 are registered by the relationship registration management section 403.

For example, in the example of FIG. 6, the accounts "User_ID_02", "User_ID_03", and "Official_ID_A" are registered as the registration information 601 in association with the account, whose specific information 501 is "User_ID_01". In the same manner, the accounts "User_ID_01", "User_ID_03", and "Official_ID_A" are registered as the registration information 601 in association with the account, whose specific information 501 is "User_ID_02".

The relationship registration information 409 may further include the information items of a registration date/time 602, which indicates the date and time when the association is registered, a registration location 603, which indicates the location where the association is registered, etc. By adding those items, it becomes possible to identify when and where the relationships between the accounts are registered.

Further, the information items which are managed by the relationship registration information 409 may be included as the information items of the account information 408.

Log Information 410

FIG. 7 illustrates an example of the log information 410 according to at least one example embodiment. As the log information 410, for example, the data of a log type 701, date/time 702, etc., are stored (recorded) for each account. The example of FIG. 7 illustrates the log information 410 of "User_ID_01". The storage section 407 stores such a log information 410 as illustrated in FIG. 7 per each account.

As the information of the log type 701, for example, the operations and the processes performed with the application are stored. In the example of FIG. 7, the information is registered indicating that the account of "User_ID_01" performed chat several times with the account of "Use_ID_03" and the relationship with the account of "Official_ID_A" is registered.

As the information of the date/time 702, for example, the date and time when the above operations and processes are performed are stored.

In the above description, it is assumed that the operations and processes are performed with the application. Note that, however, for example, the log information 410 may store information of the processes which are performed by the management server 101 side.

In this regard, as the data of the log type 701, the information may be stored, which indicates, for example, that the management server 101 transfers the chat from the account of "User_ID_01" to the account of "User_ID_03" and the registration of the relationship between the account of "User_ID_01" and the account of "Official_ID_A". In this case, the data and time when those processes are performed by the management server 101 are stored as the data of the date/time 702.

As described above, as the log information 410, the information is stored of the processes which are performed by the application of the information terminal 102 and/or the management server 101 side and which are for identifying the history of chats on an account basis and the registration of the association (relationship) between accounts.

Further, note that the management server 101 may realize the processes described below without using the log information 410.

Details of the Processes

Next, details of the processes according to at least one example embodiment is described.

Figure 8:
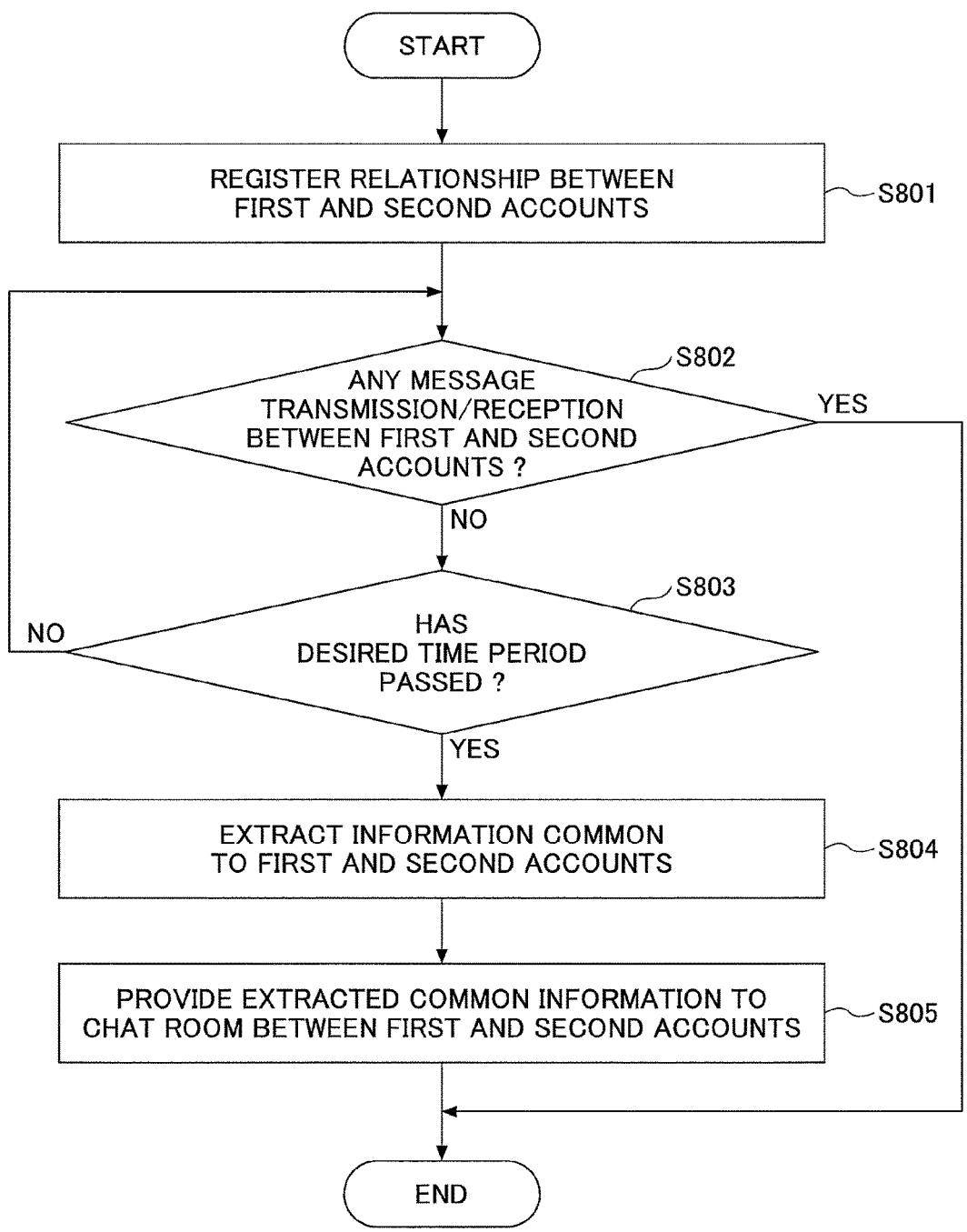
FIG. 8 is a flowchart illustrating an outline of an information providing process according to at least one example embodiment.

FIG. 8 is a flowchart illustrating an outline of an information providing process according to at least one example embodiment.

The relationship registration management section 403 of the management server 101 registers the relationship (association) between a first account and a second account (step S801).

When the relationship between the first account and the second account is registered, the information providing section 404 determines whether the transmission/receiving of a message (chat) between the first account and the second account is started within a desired (or alternatively, predetermined) time period (steps S802 and S803).

Note that the execution order between step S802 and step S803 in FIG. 8 is an example only. That is, the execution order between stop S802 and step S803 of FIG. 8 may be reversed. In this regard, the information providing section 404 may execute the process in step S803 earlier than the process in step S802 of FIG. 8.

When determining that a chat is started between the first account and the second account within the desired (or alternatively, predetermined) time period (YES in step S802), the information providing section 404 terminates the information providing process.

On the other hand, when determining that a chat is not started between the first account and the second account within the desired (or alternatively, predetermined) time period (YES in step S803), the information providing section 404 extracts the information which is related to the first account and the second account (step S804).

Further, the information providing section 404 provides the information, which is extracted in step S804, to a chat room between the first account and the second account (step S805).

By the process described above, in a case where a chat is not started within the desired (or alternatively, predetermined) period since the relationship between the first account and the second account is registered, the information related to the first account and the second account is provided to the chat room between the first account and the second account.

According to at least one example embodiment, a case is described where, as the information related to the first account and the second account, the information of a third account whose relationships with the first account and the second account are registered is provided by the information providing section 404.

Here, the third account may be an individual account or an official account. However, first, a case is described whereas the information of the third account, the information of an official account is used.

For example, in the account information 408 of FIG. 5, it is assumed that a chat is not started with the desired (or alternatively, predetermined) time period since the relationship between the first account and the second account is registered.

In this case, the information providing section 404 of the management server 101 identifies the official account, whose relationships with the user 1 (having the specific information 501 of "User_ID_01") and the user 2 (having the specific information 501 of "User_ID_02") are registered, by using the relationship registration information 409 of FIG. 6.

In the example of FIG. 6, two accounts "User_ID_03" and "Official_ID_A" are associated with each of the user 1 and the user 2. Further, according to the account type 508 of FIG. 5, it is known that the account of the "Official_ID_A" is the official account of the restaurant "A". In this case, the information providing section 404 of the management server 101 provides the information related to the account of the restaurant "A" to the chat room where the users 1 and 2 chat with each other.

Figure 9B:
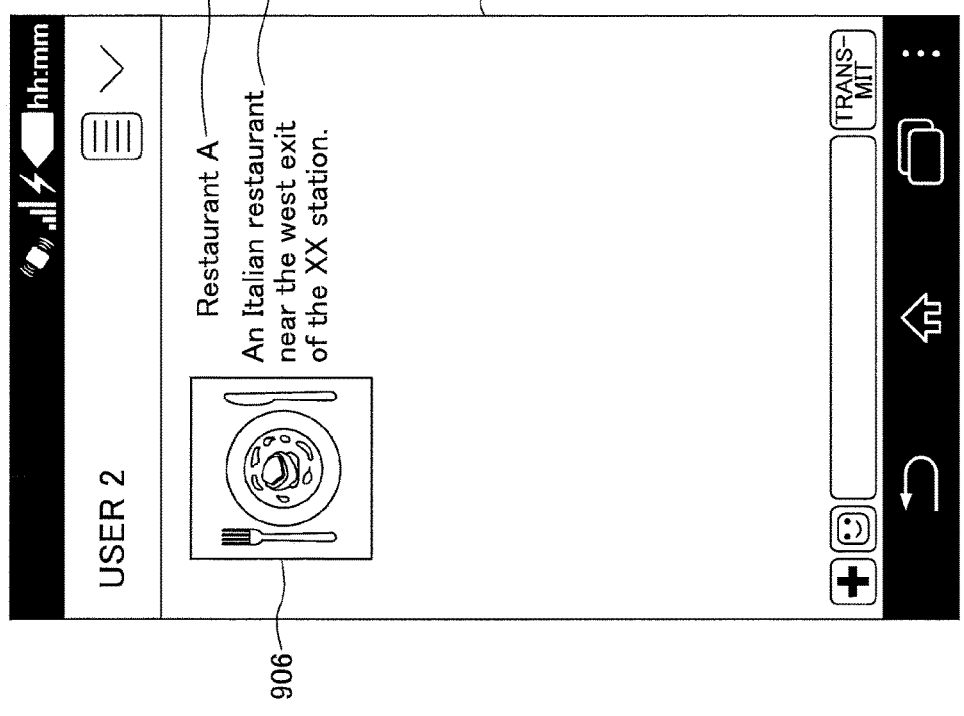
FIGS. 9A and 9B illustrate example display screens (1) according to at least one example embodiment.
Figure 9A:
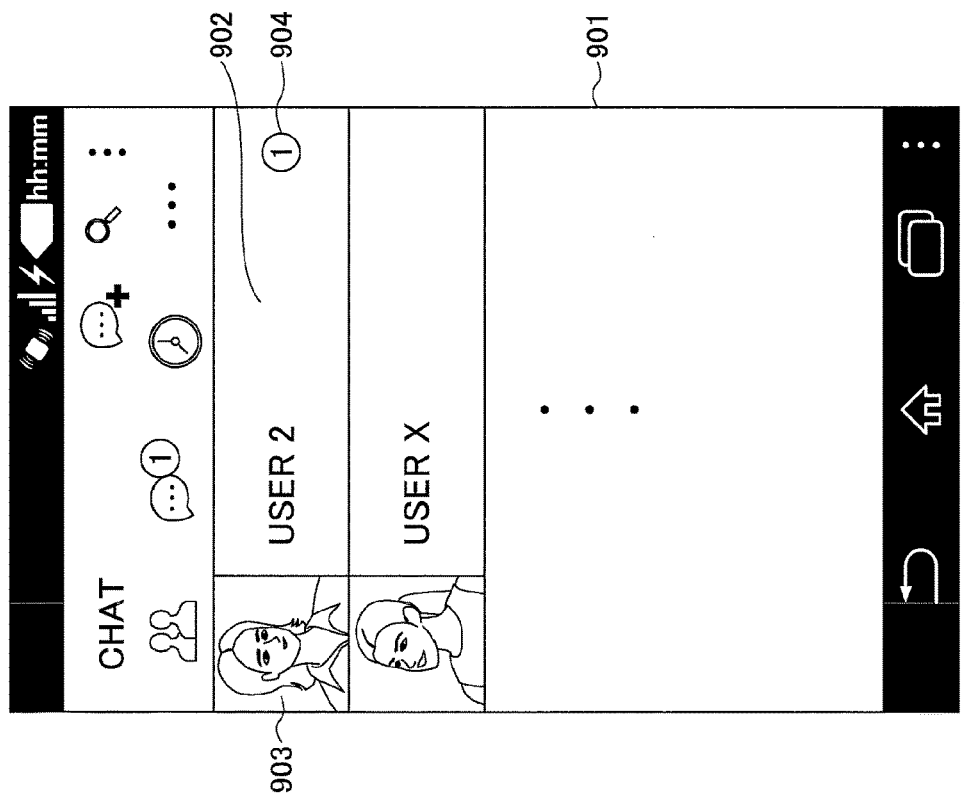

In this case, examples of the display screens, which are displayed on the information terminal 102 of the user 1 are illustrated in FIGS. 9A through 10B. FIG. 9A illustrates an example of a message list screen 901 which is displayed on the information terminal 102 of the user 1. As illustrated in FIG. 9A, similar to a case where a message is received from the user 2, a user name 902, a profile image 903, etc., of the user 2 are displayed in the message list screen 901. Further, the circled number "1" next to the user name 902 indicates the number of received messages.

In the message list screen 901 of FIG. 9A, for example, when the user name 902 of the user 2 is selected, a chat screen 905 (i.e., an example of the chat room) with the user 2 is displayed as illustrated in FIG. 9B. In the chat screen 905 of FIG. 9B, for example, a profile image 906, a name 907, a description 908, etc., of the restaurant "A" based on the account information 408 are displayed.

Figure 10A:
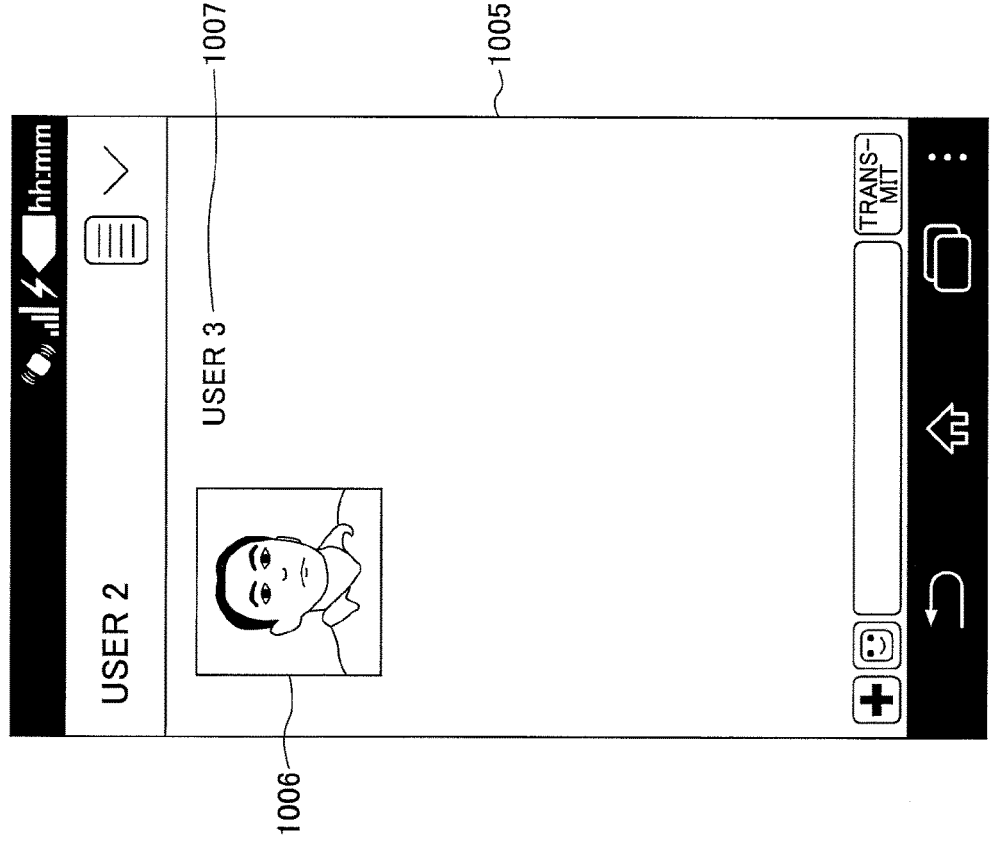
FIGS. 10A and 10B illustrate example display screens (2) according to at least one example embodiment.

Further, in the display screen of FIG. 10A, for example, when the user 1 inputs a message in the message input column 1001 and selects the "transmit" button 1002, the input message 1003 is displayed in the chat screen 1005 and is transmitted to the user 2. In response to this, when the message transmitted from the user 2 is received, the received message 1004 is displayed in the chat screen 1005.

For example, even when the chat room between the user 1 and the user 2 is automatically activated, there may be a case where it is difficult for the user 1 and the user 2 who have not chatted with each other before to find a common topic. However, according to this example embodiment, it is not only that the chat room between the user 1 and the user 2 is activated but also that an information item which is common to or related to each other is automatically provided. Due to this, it becomes easier to start chatting between the user 1 and user 2.

In the above example embodiment, an example of the display screen displayed on the information terminal 102 of the user 1 is described. Note that a similar display screen is displayed on the information terminal 102 of the user 2.

In the above description, a case is described where the information of an official account is used as the information of the third account whose relationships with the first user and the second user are registered. However, note that as the information of the third account whose relationships with the first user and the second user are registered, an individual account may also be used.

For example, in the example of FIG. 6, two accounts "User_ID_03" and "Official_ID_A" are associated with each of the accounts of the user 1 and the user 2. Further, according to the account type 508 of FIG. 5, it is known that the account of "User_ID_03" is an individual account. In this case, the information providing section 404 of the management server 101 may provide the information of the account of the user 3 to the chat room where the users 1 and 2 chat with each other.

Figure 10B:
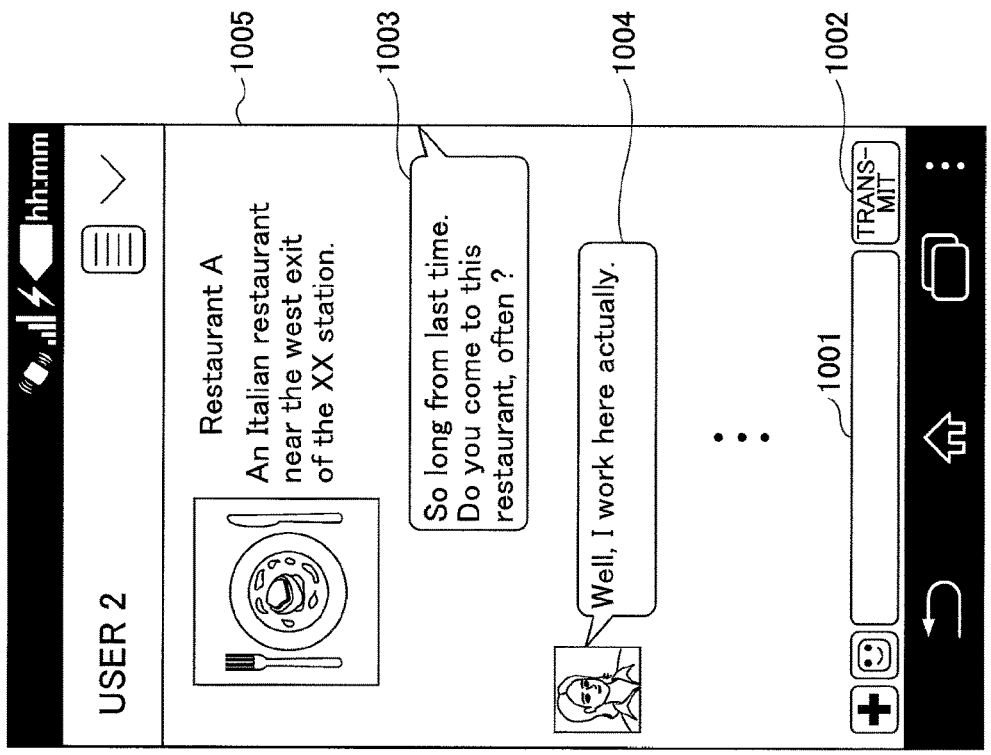

In this case, an example of the display screen which is displayed on the communication terminal of the user 1 is illustrated in FIG. 10B. In FIG. 10B, in the chat screen 1005, the profile image 1006, the name 1007, etc., of the user 3 based on the account information 408 are displayed. In this case as well, it is thought that both the user 1 and the user 2 have relationships with the user 3. Therefore, an effect similar to that when an official account is displayed can be expected.

Further, as another example, the information providing section 404 may select one account from the official account and the individual account as the information of the third account whose relationships with the first account and the second account are registered.

Further, when there are two or more accounts each of which is associated with the first user and the second user as well, it is desired for the information providing section 404 to select one account from among the two or more accounts. However, the information providing section 404 may select one by using any method.

For example, the information providing section 404 may select one account randomly. Otherwise, for example, the information providing section 404 may select one account based on the information of the area 506 in the account information 408 of FIG. 5 by selecting the account whose area 506 is closest to the area(s) 506 of the user 1 and the user 2. Otherwise, for example, the information providing section 404 may select one account based on the log information 410 of FIG. 7 by counting the number of access times which the user 1 and the user 2 access, the number of chatting times, etc., on the account basis and selecting the account having the greatest counted number. Further, information providing section 404 may select one account that the user 1 and the user 2 access or transmit and receive messages most recently based on the log information 410 if FIG. 7.

According to some example embodiments, a case is described where, as the information which is in association with the first account and the second account, the information is used which is common to (between) or related to both the account information of the first user and the account information of the second user.

For example, in the account information 408 of FIG. 5, it is assumed that chat has not started between the user 1 and the user 2 within a desired (or alternatively, predetermined) time period since the relationship between the user 1 and the user 2 is registered.

In this case, for example, the information providing section 404 of the management server 101 extracts a character string which is commonly included in the interested field 505 of the user 1 and the user 2 by using the account information 408 of FIG. 5. In the example of FIG. 5, a character string "tennis" is commonly included as the information of the interested field 505 of the user 1 and the user 2. In this case, the information providing section 404 of the management server 101 provides the information related to "tennis" in the chat room where the user 1 and the user 2 can chat with each other.

For example, the information providing section 404 extracts not only a character string which is identical but also character strings having a desired factor of association, such as a higher association than a threshold association, with each other between the user 1 and the user 2. For example, the words "court," "serve," "Federer," etc., may have a high association with the word "tennis" and thus may be extracted as well.

In this case, an example of the chat screen displayed on the information terminal 102 of the user 1 is illustrated in FIG. 11A. In the example of FIG. 11A, in the chat screen 1101, in place of the message from the user 2, the character string "tennis" selected by the information providing section 404 is displayed. For example, in the chat screen 1101 an image 1103 and a topic 1104 which are related to tennis are displayed as well. Here, it is assumed that such information of the image 1103 and the topic 1104 related to tennis is acquired from a web site(s) by the information providing section 404.

Further, when the user 1 inputs a message in the message input column 1105 and selects the "transmit" button 1106, the input message 1107 is displayed in the chat screen 1101 and is transmitted to the user 2. In response to this, when the message transmitted from the user 2 is received, the received message 1108 is displayed in the chat screen 1105.

In the above example, an example of the display screen displayed on the information terminal 102 of the user 1 is described. Note that a similar display screen is displayed on the information terminal 102 of the user 2.

In the above description, a case is described where the information providing section 404 extracts the information which is common in or related to the information in the interested field 505 of the user 1 and the user 2 by using the account information 408. Note that, however, for example, in place of the information common in the interested field 505 or the information related to the information in the interested field 505, the information providing section 404 may extract the information which is common in or related to the information in the description information 504 of the account information 408. For example, in the example of FIG. 5, in the description information 504 of the user 1 and the user 2, a character string "XX station" is commonly included. In this case, the information providing section 404 of the management server 101 provides the information related to the "XX station" to the chat room where the user 1 and the user 2 can chat with each other.

For example, the information providing section 404 extracts not only a character string which is identical but also character strings having higher association with each other between the user 1 and the user 2.

Figure 12:
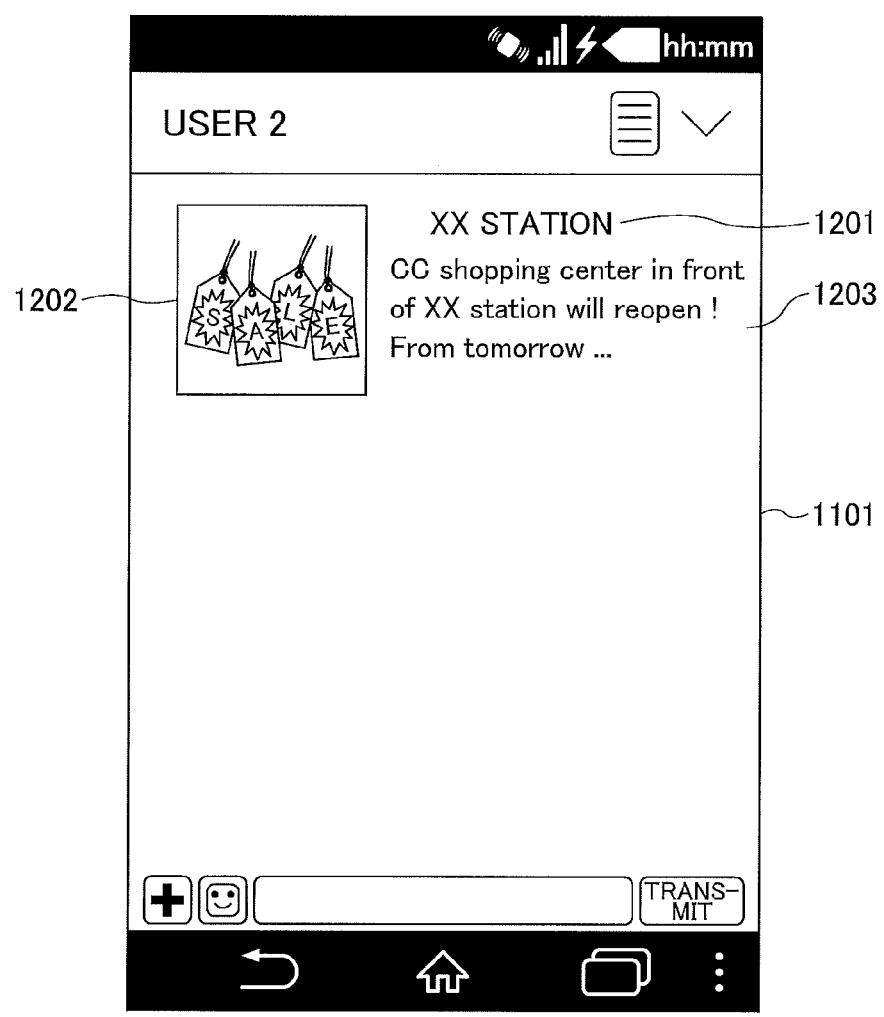
FIG. 12 illustrates an example display screen (2) according to at least one example embodiment.

In this case, an example of the chat screen displayed on the information terminal 102 of the user 1 is illustrated in FIG. 12. In the example of FIG. 12, in the chat screen 1101, the name 1201 of the "XX station" is displayed. For example, in the chat screen 1101, a topic image 1202 and a description which are related to the "XX station" are displayed as well. Here, it is assumed that the topic information is acquired from a web site(s) by the information providing section 404.

In this case as well, it is assumed that the user 1 and the user 2 have some association with the "XX station". An effect caused by providing a topic which is common between or related to the user 1 and the user 2 can be expected.

Note that the above described case where the description information 504 or the interested field 505 is used as the information common between or related to the account information of the first user and the account information of the second user is an example only. For example, any other information included in the account information 408 may also be used.

Previously, a case was described where the information providing section 404 provides the information of the third account, whose relationships with the first account and the second account are registered, as the information which is related to the first account and the second account. In actual use, however, there may be a case where there is no such account whose relationships with the first account and the second account are not registered.

In response to such a case, according to some example embodiments, a case is described where the information providing section 404 provides the information of the third account which is included in a social group to which the first account belongs and which is also included in a social group to which the second account belongs.

Functional Configuration Drawing

Figure 13:
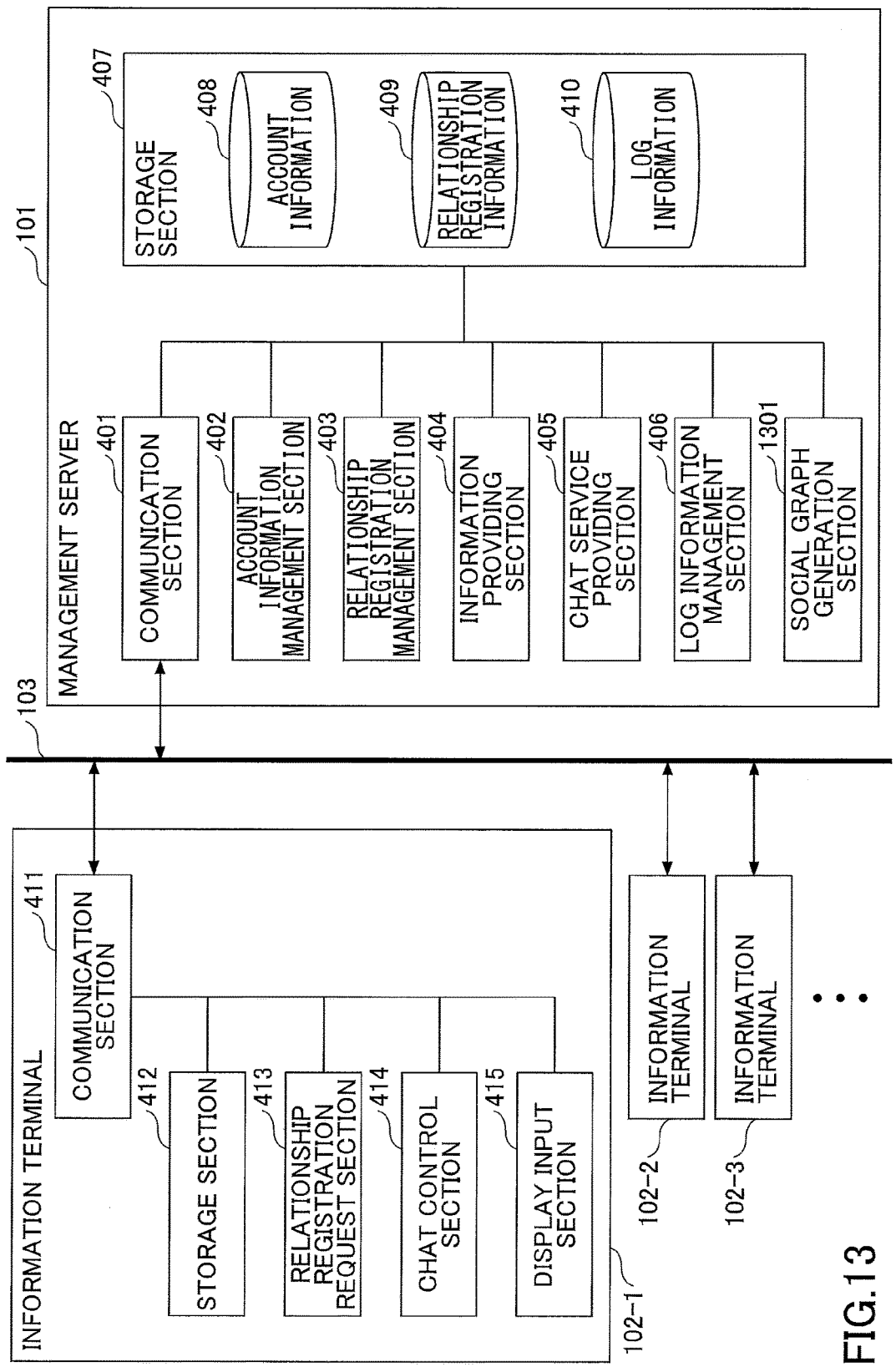
FIG. 13 illustrates an example functional configuration of the information processing system according to at least one example embodiment.

FIG. 13 illustrates an example functional configuration of an information processing system according to at least one example embodiment. In FIG. 13, the management server 101 includes the elements of the management server 101 according to FIG. 4, and further includes a social graph generation section 1301. Here, the elements other than the social graph generation section 1301 are the same as those in FIG. 4. Therefore, in the following, differences are mainly described.

The social graph generation section 1301 generates a social graph which indicates a connection relationship (human network relationship) among the accounts. For example, the social graph generation section 1301 generates a social graph described below in which a distance from a desired (or alternatively, predetermined) account is less than or equal to "N" (N: an integer greater than one) based on the registration information 601 of the relationship registration information 409 in FIG. 6.

Herein, the "social graph" refers to a graph indicating a human network relationship among accounts in which each account is described (defined) as a node and a registered relationship between accounts is described as a link. The "link" may also be called a "path", an "edge", etc. Further, the "distance" herein refers to the minimum number of links which is necessary to reach from a desired (or alternatively, predetermined) node to an object node.

For example, in a case where the relationships among the accounts registered in the relationship registration information 409 indicate friendship relationships and the value of "N" is "2", the social graph of the first account includes a "friend (N=1)" of the first account and a "friend of the friend (N=2)" as well.

Details of the Process

Figure 14:
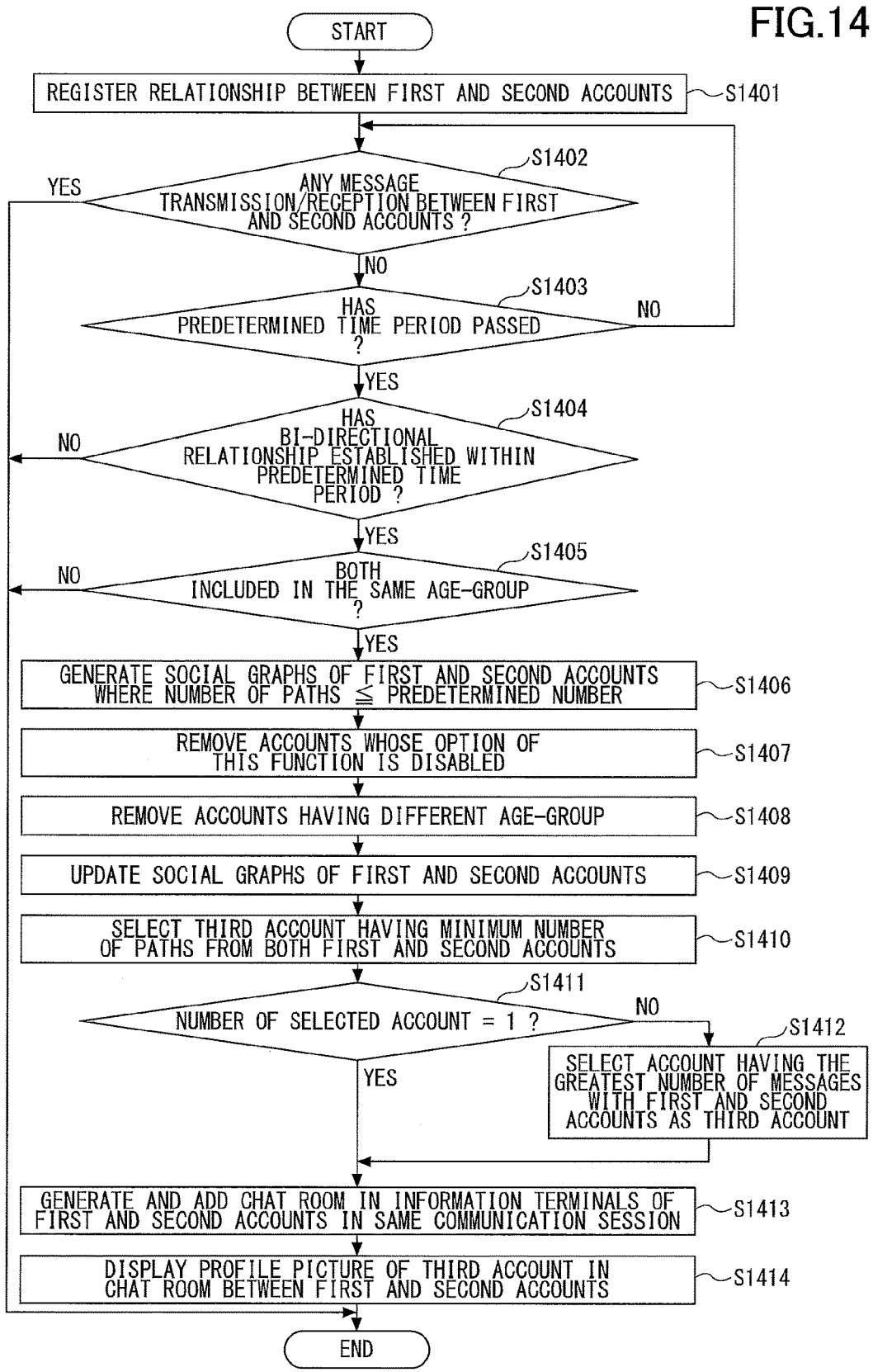
FIG. 14 is a flowchart illustrating an outline of the information providing process according to at least one example embodiment.

FIG. 14 is a flowchart of an information providing process according to at least one example embodiment.

In step S1401, for example, the relationship registration management section 403 of the management server 101 registers the association (relationship) between the first account and the second account in response to the requests from the first account and the second account.

In step S1402, the information providing section 404 of the management server 101 determines whether a message is transmitted and received (chat is performed) between the first account and the second account. When it is determined that chat is performed between the first account and the second account (YES in step S1402), the process ends. On the other hand, when it is determined that chat is not performed between the first account and the second account (NO in step S1402), the process goes to step S1403 (by the information providing section 404).

In step S1403, the information providing section 404 uses, for example, the RTC section 208 of FIG. 2 to further determine whether a desired (or alternatively, predetermined) time period (e.g., one week) has passed since the association between the first account and the second account is registered. When it is determined that the desired (or alternatively, predetermined) time period has not passed (NO ins step S1403), the process goes back to step S1402 to repeat the process of step S1402 until the desired (or alternatively, predetermined) time period has passed. On the other hand, when it is determined that the desired (or alternatively, predetermined) time period has passed, the process goes to step S1404 (by the information providing section 404).

Further, as described with reference to FIG. 8, the execution order of the process in step S1402 and the process in step S1403 may be reversed. That is, the process of step S1403 may be executed earlier than the process of step S1402.

In step S1404, for example, the information providing section 404 refers to the information such as the registration date/time 602 of the relationship registration information 409, and determines whether a bi-directional relationship between the first account and the second account has been established within a desired (or alternatively, predetermined) time period (e.g., within one hour). When it is determined that a bi-directional relationship between the first account and the second account has not been established within the desired (or alternatively, predetermined) time period (NO in step S1404), the process is terminated (by the relationship registration information 409). On the other hand, when it is determined that the bi-directional relationship between the first account and the second account has been established within the desired (or alternatively, predetermined) time period (YES in step S1404), the process goes to step S1405 (by the relationship registration information 409 (information providing section 404)).

In step S1405, for example, the information providing section 404 refers to the information of the age 507 of the account information 408, and determines whether the age is included in the same age group to which the first account and the second account belong. When it is determined that the age is not included in the same age group to which the first account and the second account belong, the process is terminated (by the information providing section 404). On the other hand, when it is determined that the age is included in the same age group to which the first account and the second account belong, the process goes to step S1406 (by the information providing section 404).

In step S1406, the social graph generation section 1301 of the management server 101 generates the social graph of each of the first account and the second account in which the distance from the account is less than or equal to "N (e.g., "3")".

Figure 15:
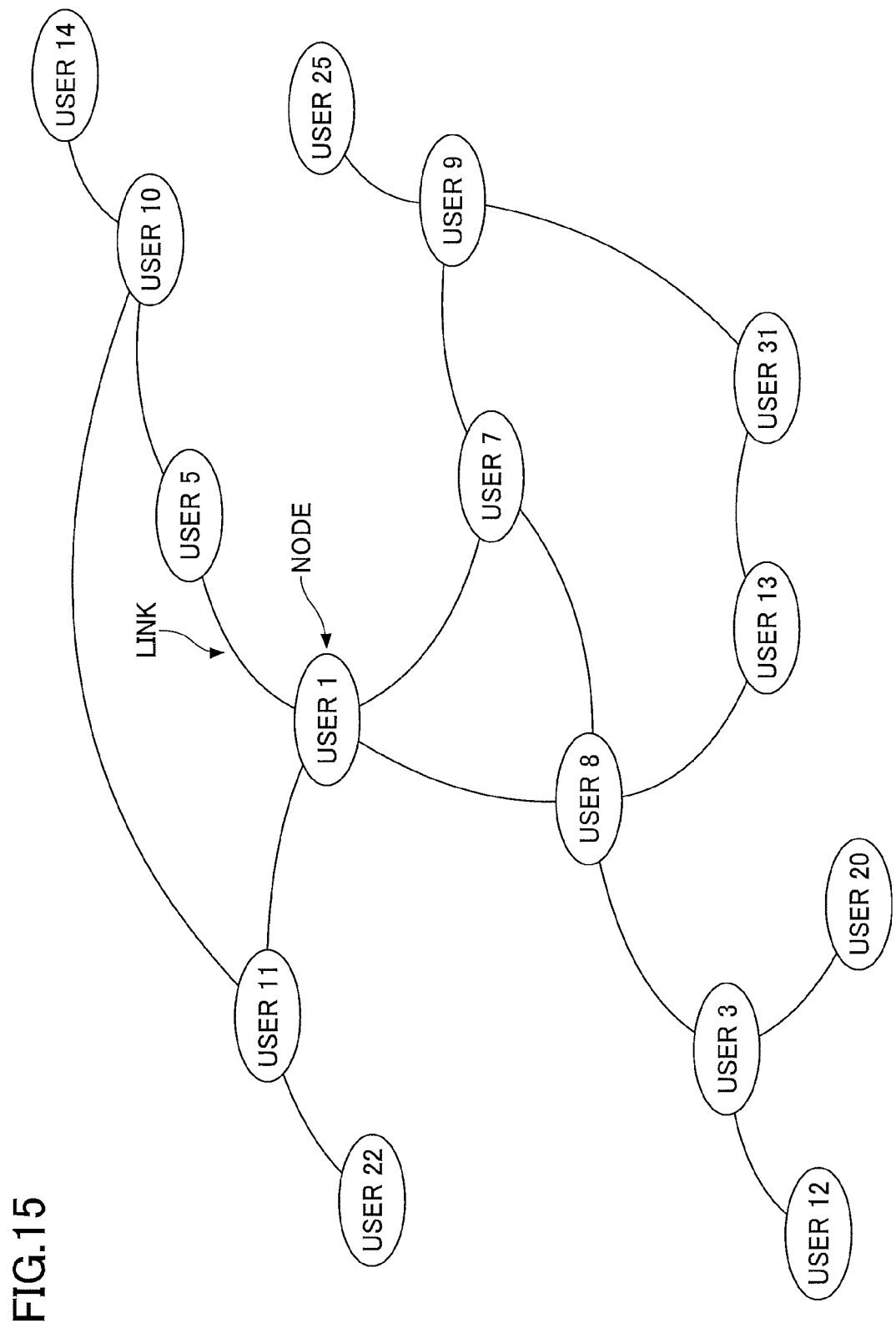
FIG. 15 illustrates an example of a social graph according to at least one example embodiment.

FIG. 15 illustrates an example of the social graph according to at least one example embodiment. More specifically, FIG. 15 illustrates an example of the social graph in which the user 1 (the first account) is set as the center, and the distance (the numbers of the link) therefrom is less than or equal to "3" (N≤3).

By doing this, based on the distance "N" set in advance, the social graph generation section 1301 generates a first social graph, which indicates the human relationships related to the first account, and a second social graph which indicates the human relationships related to the second account. Further, in this case, in order to distinguish the human relationships related the first account from the human relationships related the second account, the social graph generation section 1301 may generate the social graphs by removing the link between the first account and the second account.

Referring back to FIG. 14, and description of the flowchart continues.

In step S1407, the social graph generation section 1301 removes the account, in which an option of the function (to provide the information of the own account to the chat room between the own account and the account) is disabled, from the generated social graphs. By doing this, it becomes possible to prevent the information of the own account from being provided to the chat room between the own account and the account against the intention of the user.

In step S1408, the social graph generation section 1301 removes the accounts having different ages (age-groups) from the generated social graphs. This is because, generally, it is thought to be difficult to establish communications when the age-groups differ from each other.

In step S1409, the social graph generation section 1301 updates the social graphs of the first account and the second account based on the accounts which were not removed in steps S1407 and S1408.

In step S1410, the information providing section 404 selects the third account which has the minimum distance from each of the first account and the second account.

FIGS. 16A and 16B illustrate examples of the distances between users according to at least one example embodiment.

FIG. 16A illustrates an example where other users (accounts) are classified depending on the distances from the user 1 (the first account) based on the social graph of FIG. 15. For example, FIG. 16A illustrates four users (i.e., users 11, 5, 7, and 8) as the users having the distance "1" from the user 1. Similarly, the users having the distances "2" and "3" are described (classified).

Note that, by using the same manner of FIG. 16A, it is possible to generate the table for the second account where other users (accounts) are classified depending on the distances from the user 2 (the second account). FIG. 16B illustrates an example where other users (accounts) are classified depending on the distances from the user 2.

Based on the examples of FIGS. 16A and 16B, the user 3 and the user 12 are included in both tables of FIGS. 16A and 16B. Further, in this case, the distance from the user 1 to the user 3 is "2", and the distance from the user 2 to the user 3 is "2" as well. Thus, the total value of the distances is "4". On the other hand, the distance from the user 1 to the user 12 is "2", and the distance from the user 2 to the user 12 is "3". Thus, the total value of the distances is "5".

Accordingly, in the example of FIGS. 16A and 16B, the information providing section 404 can select the user 3, which has the minimum distance from the first account and the second account, as the third account.

Referring back to FIG. 14, and description of the flowchart continues.

In step S1411, the information providing section 404 determines whether the number of the accounts selected in step S1410 is one. When it is determined that the number of the accounts selected in step S1410 is one (YES in step S1411), the process goes to step S1413 (by the information providing section 404). On the other hand, when it is determined that the number of the accounts selected in step S1410 is other than one (NO in step S1411), the process goes to step S1412 (by the information providing section 404).

In step S1412, for example, the information providing section 404 selects the account, which has the greatest number of transmitting and receiving messages to and from the first account and the second account within a desired (or alternatively, predetermined) time range from among the selected plural accounts, as the third account.

To that end, for example, the information providing section 404 acquires (calculates) the number of transmitting and receiving the messages (chatting) with the first account and the number of transmitting and receiving the messages (chatting) with the second account as well. The sum of those numbers is determined as the number of the messages transmitted and received to and from the first account and the second account. By doing this, it becomes possible to identify the accounts having the greatest number of the messages transmitted and received to and from the first account and the second account.

Further, as the method of selecting the third account from among the selected plural accounts, any method other than the method described above may be used.

For example, the information providing section 404 may randomly select one account from among the plural accounts. Otherwise, the information providing section 404 may select one account corresponding to the area which is closer to the area(s) of the user 1 and the user 2 based on the information of the area 506 of the account information 408 of FIG. 5. Otherwise, for example, the information providing section 404 may select one account which is accessed by the user 1 and the user 2 most recently based on the log information 410 of FIG. 7.

Referring back to FIG. 14, and description of the flowchart continues.

In step S1413, the chat service providing section 405 of the management server 101 generates a chat room for the information terminal 102 of the first account and the information terminal 102 of the second account, so as to be included in the same communication session.

In step S1414, the information providing section 404 displays the information (e.g., the profile image, etc.) of the third account in the chat room where the first account and the second account chat with each other. In this case, examples of the display screens displayed on the information terminal 102 of the first user is illustrated in FIGS. 17A and 17B.

Figure 17A:
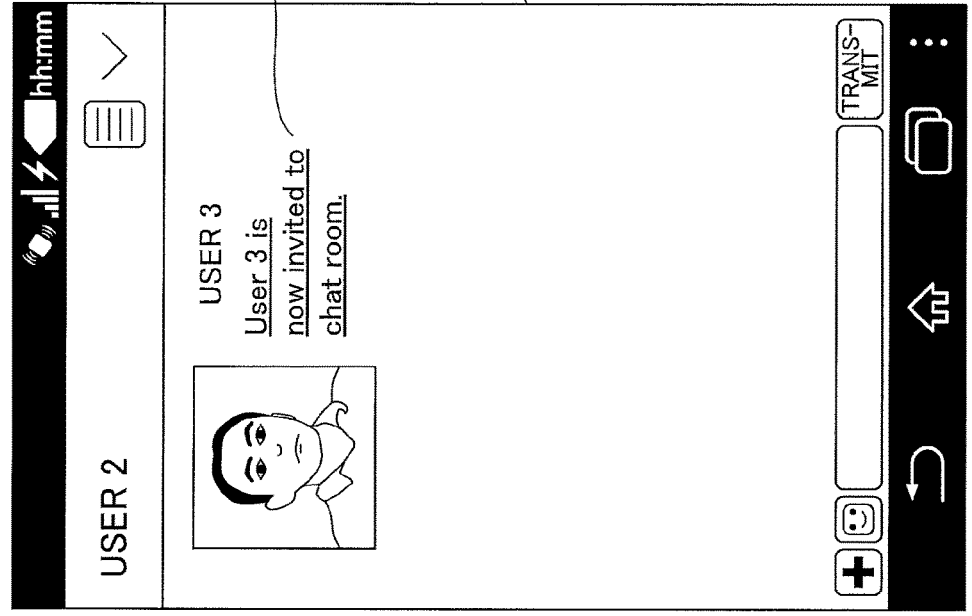
FIGS. 17A and 17B illustrate example display screens (1) of a chat room according to at least one example embodiment.
Figure 17B:
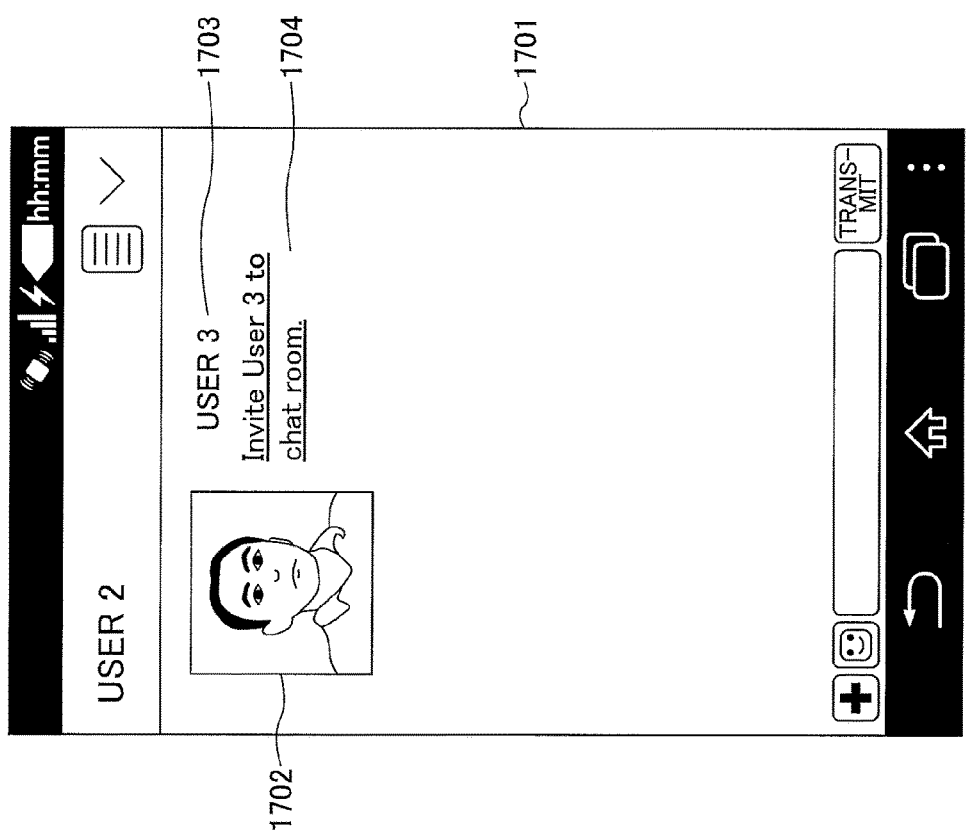

As illustrated in FIG. 17A, in the chat screen 1701 (as an example of the chat room), the profile image 1702, the name 1703, etc., of the user 3 who is selected as the third account are displayed based on, for example, the account information 408.

As described, according to at least one example embodiment, it becomes possible to provide the information of the third account related to the first account and the second account based on the social graph even when there is no account whose direct association with the first account and/or the second account is registered.

According to at least one example embodiment, there is link information 1704, which invites the third user to the chat room where the first account and the second account chat with each other, displayed in the chat room (chat screen 1701) between the first account and the second account.

For example, by selecting the link information 1704, the user 1 can invite the user 3 into the chat room where the user 1 and the user 2 participate. Further, it is assumed that similar link information is displayed in the chat screen of the information terminal 102 of the user 2, so that the user 2 also can invite the user 3 into the chat room.

For example, in FIG. 17A, when the user 1 selects the link information 1704, the link information 1704 is changed into the information 1705 which indicates that the user 3 is now invited as illustrated in FIG. 17B.

Further, the chat service providing section 405 of the management server 101 notifies the information terminal 102 of the user 3 that the user 3 is invited into the chat room of the user 1 and the user 2. In response to the notification, by operating so as to participate in the chat room, the user 3 can participate in the chat room of the user 1 and the user 2.

For example, when the user 3 operates so as to participate in the chat room of the user 1 and the user 2, the chat service providing section 405 generates a chat room for the information terminal 102 of the user 3, and adds the chat room in the same session as that of the user 1 and the user 2. By doing this, it becomes possible for the users 1 through 3 to chat with each other. An example of the display screen displayed on the information terminal 102 of the user 1 in this case is illustrated in FIG. 18.

Figure 18:
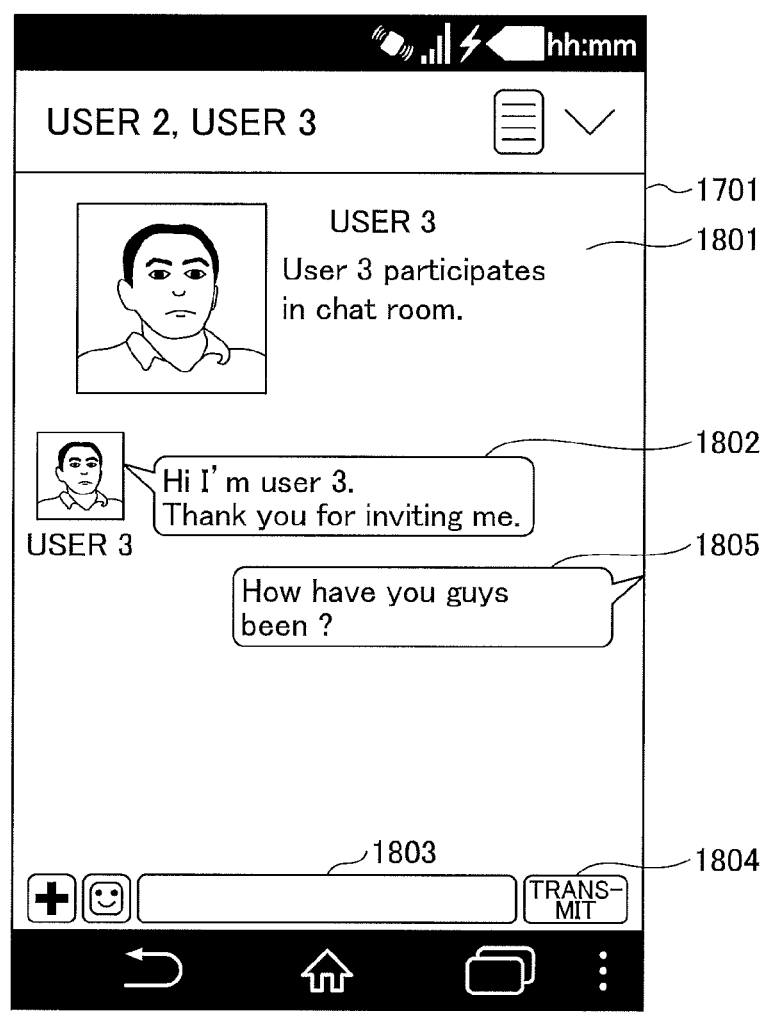
FIG. 18 illustrates an example display screen (2) of the chat room according to at least one example embodiment.

In the example of FIG. 18, in the chat screen 1701, the information 1801 is displayed indicating that the user 3 participates in the chat room. Further, the message 1802 written by the user 3 is displayed in the chat screen 1701.

In response, for example, the user 1 inputs a message in the message input column 1803 and presses the "transmit" button 1804, then the input message 1805 is displayed in the chat screen 1701. Further, the input message 1805 is transferred by the chat service providing section 405 of the management server 101 to the information terminal 102 of the user 2 and the information terminal 102 of the user 3 and is displayed in the respective chat screens.

In the same manner, a message input by the user 2 is displayed in the chat screen 1701 of the information terminal 102 of the user 1 and the chat screen of the information terminal 102 of the user 3.

As described, by inviting the user 3 who is associated with the user 1 and the user 2 into the chat room of the user 1 and user 2, it becomes possible to further promote the communications between the user 1 and the user 2.

Further, note that the present invention is not limited to the example embodiments specifically disclosed above, and various modifications and changes are possible without departing from a scope of the claimed inventions.

In other words, although the invention has been described with respect to specific example embodiments for a complete and clear disclosure, the appended claims are not to be thus limited but are to be construed as embodying all modifications and alternative constructions that may occur to one skilled in the art that fairly fall within the basic teaching herein set forth.

For example, it is possible to combine various example embodiments and use the combined example embodiments.

Further, for example, the link information 1704 described above may be displayed in the chat screen 905 of FIG. 10B.

Further, the account, which is displayed in the chat screen 1701, may be an official account.

Further, the information which is commonly included in the account information of the first account and the account information of the second account may be displayed along with the information of the third account.

Further, the information providing section 404 may provide the information which is related to the first account and the second account in the chat room between the first account and the second account based on the log information 410. For example, the information providing section 404 may provide the information of the third account which chats with the first account and the second account most frequently to the chat room between the first account and the second account. Otherwise, the information of the third account which chatted with the first account and the second account most recently may be provided to the chat room between the first account and the second account.

Further, the information providing section 404 may provide the information, which is related to the first account and the second account according to the information of the registration date/time 602 and the registration location 603 of the relationship registration information 409, to the chat room between the first account and the second account. For example, the information providing section 404 may provide the information of the third account having the registered relationships with the first account and the second account including closer registration location 603 and the registration date/time 602 to the chat room between the first account and the second account.

The example embodiments as disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

It will be apparent to those skilled in the art that various modifications and variations can be made to the example embodiments without departing from the spirit or scope of the inventive concepts described herein. Thus, it is intended that the example embodiments cover the modifications and variations of the example embodiments provided they come within the scope of the appended claims and their equivalents.

What is claimed is:

1. An information processing apparatus comprising:
a memory having computer readable instructions stored thereon; and
at least one processor configured to execute the computer readable instructions to,
manage registration of an association between a plurality of accounts related to an online message transmission and receiving service, the plurality of accounts including a first account and a second account, the plurality of accounts registered with the online message transmission and receiving service;
determine whether message transmission and/or reception has been performed between the first account and the second account of the online message transmission and receiving service within a desired time period;
generate a chat room where the message transmission and reception is performed between the first account and the second account based on one or more determination results, the one or more determination results indicating that no message transmission or reception has been performed on the online message transmission and receiving service between the first account and the second account during the desired time period; and
provide related information to the chat room, the related information including information related to the first account and the second account, the related information based on information included in profiles on the online message transmission and receiving service, the related information including information related to common interests of the first account and the second account associated with each of the first account and the second account based on the one or more determination results.

2. The information processing apparatus according to claim 1, wherein the related information includes information of a third account whose associations with the first account and the second account are registered.

3. The information processing apparatus according to claim 1, wherein the at least one processor is further configured to execute the computer readable instructions to:
generate social graphs corresponding to the accounts related to the online message transmission and receiving service based on whether registered relationship connections exist between the accounts of the online message transmission and receiving service; and
the related information includes information related to a third account of the online message transmission and receiving service which is included in the social graph of the first account and included in the social graph of the second account.

4. The information processing apparatus according to claim 2, wherein the related information includes link information which creates an electronic invitation request to the third account to join the chat room.

5. The information processing apparatus according to claim 2, wherein the third account is an official account which officially distributes information by a desired account.

6. The information processing apparatus according to claim 1, wherein the related information includes information which is related to a desired service.

7. The information processing apparatus according to claim 1, wherein the related information includes link information which is related to a desired service.

8. The information processing apparatus according to claim 1, wherein the at least one processor is further configured to execute the computer readable instructions to:
manage log information which includes a history of the message transmission and/or reception on the online message transmission and receiving service; and
provide the related information based on the history of the message transmission and/or reception.

9. The information processing apparatus according to claim 1, wherein the at least one processor is further configured to execute the computer readable instructions to:
manage information of a location or date/time when the registration of the association is performed; and
provide the related information based on the location or date/time when the registration of the association between the first account and the second account is performed.

10. The information processing apparatus according to claim 1, wherein the at least one processor is further configured to execute the computer readable instructions to:
manage account information of the accounts related to the online message transmission and receiving service; and
the related information includes information common between or related to account information of the first account and account information of the second account.

11. A non-transitory computer readable medium including computer readable instructions, which when executed by at least one processor, causes the at least one processor to:
manage a registration of an association between a plurality of accounts related to an online message transmission and receiving service, the plurality of accounts including a first account and a second account, the plurality of accounts registered with the online message transmission and receiving service;
determine whether message transmission and/or reception has been performed between the first account and the second account of the online message transmission and receiving service within a desired time period;
generate a chat room where the message transmission and reception is performed between the first account and the second account based on one or more determination results, the one or more determination results indicating that no message transmission or reception has been performed on the online message transmission and receiving service between the first account and the second account during the desired time period; and
provide related information to the chat room, the related information including information related to the first account and the second account, the related information based on information included in profiles associated with each of the first account and the second account on the online message transmission and receiving service, the related information including information related to common interests of the first account and the second account based on the one or more determination results.

12. The non-transitory computer readable medium according to claim 11, wherein the related information includes information of a third account whose associations with the first account and the second account are registered.

13. The non-transitory computer readable medium according to claim 11, further including computer readable instructions, which when executed by the at least one processor, configures the at least one processor to:
generate social graphs corresponding to the accounts related to the online message transmission and receiving service based on whether registered relationship connections exist between the accounts of the online message transmission and receiving service; and
wherein the related information includes information related to a third account of the online message transmission and receiving service which is included in the social graph of the first account and included in the social graph of the second account.

14. The non-transitory computer readable medium according to claim 12, wherein the related information includes link information which creates an electronic invitation request to the third account to join the chat room.

15. The non-transitory computer readable medium according to claim 12, wherein the third account is an official account which officially distributes information by a desired account.

16. The non-transitory computer readable medium according to claim 11, wherein the related information includes information which is related to a desired service.

17. The non-transitory computer readable medium according to claim 11, wherein the related information includes link information which is related to a desired service.

18. The non-transitory computer readable medium according to claim 11, further including computer readable instructions, which when executed by the at least one processor, configures the at least one processor to:
   manage log information which includes a history of the message transmission and/or reception on the online message transmission and receiving service; and
   provide the related information based on the history of the message transmission and/or reception.

19. The non-transitory computer readable medium according to claim 11, further including computer readable instructions, which when executed by the at least one processor, configures the at least one processor to:
   manage information of a location or date/time when the registration of the association is performed; and
   provide the related information based on the location or date/time when the registration of the association between the first account and the second account is performed.

20. The non-transitory computer readable medium according to claim 11, further including computer readable instructions, which when executed by the at least one processor, configures the at least one processor to:
   manage account information of the accounts related to the online message transmission and receiving service; and
   wherein the related information includes information common between or related to account information of the first account and account information of the second account.

21. An information providing method used in an information processing apparatus which manages an online message transmission and receiving service, the method comprising:
   registering, using at least one processor, an association between a first account and a second account of a plurality of accounts on the online message transmission and receiving service, the plurality of accounts registered with the online message transmission and receiving service;
   determining, using the at least one processor, whether a message transmission and/or reception has been performed between the first account and the second account on the online message transmission and receiving service within a desired time period;
   generating, using the at least one processor, a chat room where the message transmission and reception is performed between the first account and the second account based on one or more determination results, the one or more determination results indicating that no message transmission or reception has been performed on the online message transmission and receiving service between the first account and the second account during the desired time period;
   extracting, using the at least one processor, related information related to the first account and the second account from profiles associated with each of the first account and the second account on the online message transmission and receiving service, the related information including information related to common interests of the first account and the second account based on the one or more results of the determining; and
   providing, using the at least one processor, the related information to the chat room.

22. The method according to claim 21, wherein the related information includes information of a third account whose associations with the first account and the second account are registered.

23. The method according to claim 21, further comprising:
   generating, using the at least one processor, social graphs corresponding to the accounts related to the online message transmission and receiving service based on whether registered relationship connections exist between the accounts of the online message transmission and receiving service; and
   wherein the related information includes information related to a third account of the online message transmission and receiving service which is included in the social graph of the first account and included in the social graph of the second account.

24. The method according to claim 22, wherein the related information includes link information which creates an electronic invitation request to the third account to join the chat room.

25. The method according to claim 22, wherein the third account is an official account which officially distributes information by a desired account.

26. The method according to claim 21, wherein the related information includes information which is related to a desired service.

27. The method according to claim 21, wherein the related information includes link information which is related to a desired service.

28. The method according to claim 21, further comprising:
   managing, using the at least one processor, log information which includes a history of the message transmission and/or reception on the online message transmission and receiving service; and
   providing, using the at least one processor, the related information based on the history of the message transmission and/or reception.

29. The method according to claim 21, further comprising:
   managing, using the at least one processor, information of a location or date/time when the registration of the association is performed; and
   providing, using the at least one processor, the related information based on the location or date/time when the registration of the association between the first account and the second account is performed.

30. The method according to claim 21, further comprising:
   managing, using the at least one processor, account information of the accounts related to the online message transmission and receiving service; and wherein the related information includes information common between or related to account information of the first account and account information of the second account.

\* \* \* \* \*